United States Patent
Will et al.

(10) Patent No.: US 10,539,266 B2
(45) Date of Patent: Jan. 21, 2020

(54) WALL ANCHORS

(71) Applicant: THE HILLMAN GROUP, INC., Cincinnati, OH (US)

(72) Inventors: Gary E. Will, Gold Canyon, AZ (US); Byron K. Grice, Phoenix, AZ (US); Dale G. Malott, Middlebury, IN (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 0 days.

(21) Appl. No.: 15/195,132

(22) Filed: Jun. 28, 2016

(65) Prior Publication Data
US 2017/0002973 A1 Jan. 5, 2017

Related U.S. Application Data

(60) Provisional application No. 62/186,872, filed on Jun. 30, 2015.

(51) Int. Cl.
| | |
|---|---|
| *A47F 5/08* | (2006.01) |
| *F16M 13/02* | (2006.01) |
| *A47G 1/20* | (2006.01) |
| *F16B 15/02* | (2006.01) |

(52) U.S. Cl.
CPC ............. *F16M 13/02* (2013.01); *A47G 1/20* (2013.01); *A47G 1/202* (2013.01); *F16B 15/02* (2013.01)

(58) Field of Classification Search
CPC ........... A47G 1/20; A47G 1/202; F16M 13/02
USPC ...... 248/231.91, 216.1, 217.3, 475.1, 220.43
See application file for complete search history.

(56) References Cited

U.S. PATENT DOCUMENTS

| | | | |
|---|---|---|---|
| 113,862 A | | 4/1871 | Duffett |
| 165,206 A | * | 6/1875 | Brown |
| 251,616 A | | 12/1881 | McGill |
| 297,173 A | | 4/1884 | Seliger |
| 371,205 A | | 10/1887 | McConnoughay |
| 423,730 A | | 3/1890 | Charlton |
| 444,933 A | | 1/1891 | Barnes |
| 489,593 A | | 1/1893 | Ramer |
| 763,448 A | | 6/1904 | Winter |
| 769,794 A | | 9/1904 | Fowler |
| 777,879 A | | 12/1904 | Blum |
| 795,704 A | | 7/1905 | Jones |
| 874,412 A | | 12/1907 | Lewis |
| 938,998 A | | 11/1909 | Evans |

(Continued)

FOREIGN PATENT DOCUMENTS

| | | |
|---|---|---|
| CN | 1050759 | 4/1991 |
| CN | 1154159 | 7/1997 |

(Continued)

OTHER PUBLICATIONS

PCT, International Search Report and Written Opinion, International Application No. PCT/US2016/039722; dated Nov. 10, 2016, 13 pages.

(Continued)

*Primary Examiner* — Todd M Epps
(74) *Attorney, Agent, or Firm* — Thompson Hine L.L.P.

(57) ABSTRACT

A wall anchors in the form of a base with one or more wall penetrating retainers having respective wall penetrating extents that are curved. The retainers and base are configured to enable manual insertion onto wall without the use of tools.

34 Claims, 13 Drawing Sheets

(56) References Cited

U.S. PATENT DOCUMENTS

| | | | |
|---|---|---|---|
| 965,151 A | 7/1910 | Benjamin | |
| 992,203 A | 5/1911 | Johnson | |
| 998,015 A | 7/1911 | Kopsa | |
| 1,002,910 A | 9/1911 | Foote | |
| 1,270,718 A | 6/1918 | Ford | |
| 1,306,114 A | 6/1919 | Koval | |
| 1,343,855 A | 6/1920 | Tyler | |
| 1,425,873 A | 8/1922 | Lineaweaver | |
| 1,651,392 A | 12/1927 | Honigbaum | |
| 1,802,934 A | 4/1931 | Balch | |
| 1,883,834 A | 10/1932 | Turner | |
| 1,958,497 A | 5/1934 | Rivers | |
| 2,062,887 A | 12/1936 | Karst | |
| 2,119,931 A | 6/1938 | Smith | |
| 2,197,750 A | 4/1940 | Lagaard | |
| 2,295,370 A | 9/1942 | Tritt | |
| 2,317,368 A | 4/1943 | Frey | |
| 2,334,700 A | 11/1943 | Frey | |
| 2,505,324 A | 4/1950 | Cornelius | |
| 2,539,825 A | 1/1951 | Genua | |
| 2,577,011 A | 12/1951 | Hallenscheid | |
| 2,751,807 A * | 6/1956 | Stausgaard | F16B 15/00 |
| | | | 411/473 |
| 2,980,309 A | 4/1961 | Papas | |
| 3,001,752 A | 9/1961 | Loy | |
| 3,004,815 A | 10/1961 | O'Kain | |
| 3,020,602 A | 2/1962 | Siering | |
| 3,174,592 A | 3/1965 | Berman | |
| 3,226,065 A | 12/1965 | Smith | |
| 3,298,651 A * | 1/1967 | Passer | A47G 1/20 |
| | | | 248/217.2 |
| 3,319,917 A | 5/1967 | Bilodeau | |
| 3,425,568 A | 2/1969 | Albright | |
| 3,503,147 A | 3/1970 | Herrin | |
| 3,524,584 A | 8/1970 | Ihlenfeld | |
| 3,620,404 A | 11/1971 | Grasso | |
| 3,640,497 A | 2/1972 | Waki | |
| 3,666,936 A | 5/1972 | Webster | |
| 3,685,778 A | 8/1972 | Berns | |
| 3,754,805 A | 8/1973 | Pangburn | |
| 3,775,884 A | 12/1973 | Smith | |
| 3,813,800 A | 6/1974 | Turner | |
| 3,861,631 A | 1/1975 | Shorin | |
| 3,891,172 A * | 6/1975 | Einhorn | A47F 5/0823 |
| | | | 248/220.43 |
| 3,912,211 A | 10/1975 | Topf | |
| 3,926,394 A | 12/1975 | Mauceri et al. | |
| 3,929,194 A | 12/1975 | Warfel | |
| 3,966,157 A | 6/1976 | Corral et al. | |
| 3,995,822 A | 12/1976 | Einhorn et al. | |
| 4,017,048 A | 4/1977 | Einhorn | |
| 4,039,138 A | 8/1977 | Einhorn | |
| 4,040,149 A | 8/1977 | Einhorn | |
| 4,082,243 A | 4/1978 | Watt | |
| 4,083,314 A | 4/1978 | Garvin | |
| 4,124,189 A | 11/1978 | Einhorn | |
| 4,134,625 A | 1/1979 | Palka | |
| D255,301 S | 6/1980 | Windisch | |
| 4,208,012 A | 6/1980 | Dutcher | |
| 4,221,442 A | 9/1980 | Harangozo | |
| 4,228,982 A | 10/1980 | Sellera | |
| 4,237,630 A | 12/1980 | Franzone | |
| 4,262,605 A | 4/1981 | Sokol | |
| 4,293,173 A | 10/1981 | Tricca | |
| 4,294,778 A | 10/1981 | DeLuca | |
| 4,300,745 A | 11/1981 | Peterson | |
| 4,304,447 A | 12/1981 | Ellwood | |
| 4,317,603 A | 3/1982 | Pepicelli | |
| 4,333,625 A * | 6/1982 | Haug | A47G 1/20 |
| | | | 248/216.1 |
| 4,340,144 A | 7/1982 | Cousins | |
| 4,372,450 A | 2/1983 | Licari | |
| 4,422,608 A | 12/1983 | Hogg | |
| 4,452,500 A | 6/1984 | Zlotnik | |
| 4,458,387 A | 7/1984 | Pearson | |
| 4,485,995 A | 12/1984 | Hogg | |
| 4,505,226 A | 3/1985 | Carlson | |
| 4,506,856 A | 3/1985 | Rich | |
| 4,509,713 A | 4/1985 | Hogg | |
| 4,572,380 A | 2/1986 | Langwell | |
| 4,583,647 A | 4/1986 | Schinzing | |
| D285,743 S | 9/1986 | Richwine | |
| 4,613,108 A | 9/1986 | Sundstrom et al. | |
| D286,118 S | 10/1986 | Gecchelin | |
| 4,619,430 A | 10/1986 | Hogg | |
| 4,655,423 A | 4/1987 | Schavilje et al. | |
| 4,681,380 A | 7/1987 | Carlin | |
| 4,719,917 A | 1/1988 | Barrows et al. | |
| 4,831,754 A | 5/1989 | Tallent | |
| 4,932,519 A | 6/1990 | Trauschke | |
| 4,976,057 A | 12/1990 | Bianchi | |
| 4,998,361 A | 3/1991 | Gordon | |
| 5,103,573 A | 4/1992 | Ehling | |
| 5,110,080 A | 5/1992 | Rieman | |
| 5,135,194 A | 8/1992 | Laughon | |
| 5,138,134 A | 8/1992 | Ellison | |
| 5,149,037 A | 9/1992 | Smith | |
| 5,241,715 A | 9/1993 | Duvall | |
| 5,265,357 A | 11/1993 | Yu | |
| 5,267,715 A | 12/1993 | Owen | |
| 5,267,719 A | 12/1993 | Keller | |
| 5,325,815 A | 7/1994 | Gumpesberger | |
| 5,332,108 A | 7/1994 | Blass | |
| 5,351,842 A | 10/1994 | Remmers | |
| 5,372,346 A | 12/1994 | Upchurch | |
| 5,401,094 A | 3/1995 | Walsten | |
| 5,407,160 A * | 4/1995 | Hollingsworth | A47F 5/0823 |
| | | | 248/220.43 |
| 5,454,542 A | 10/1995 | Hart | |
| 5,477,010 A | 12/1995 | Buckshaw | |
| 5,484,126 A | 1/1996 | Kitchin | |
| 5,495,954 A | 3/1996 | Schmidt | |
| 5,507,248 A | 4/1996 | Gabbed | |
| 5,517,947 A | 5/1996 | Christman | |
| 5,570,938 A | 11/1996 | Butler | |
| 5,586,934 A | 12/1996 | Dombrowski | |
| 5,638,644 A | 6/1997 | Bastian | |
| 5,641,079 A | 6/1997 | Schmidt | |
| 5,727,698 A | 3/1998 | Lai | |
| 5,743,038 A | 4/1998 | Soto | |
| 5,806,223 A | 9/1998 | Visagie | |
| D399,692 S | 10/1998 | Wilcox | |
| 5,819,958 A | 10/1998 | Dement | |
| 5,839,649 A | 11/1998 | Clark | |
| 5,878,988 A | 3/1999 | Rakower | |
| 5,906,032 A | 5/1999 | Fredriksson | |
| 6,042,243 A | 3/2000 | Grill | |
| 6,045,374 A | 4/2000 | Candeloro | |
| 6,051,788 A | 4/2000 | Nichols | |
| 6,109,461 A | 5/2000 | Kluge | |
| 6,126,126 A | 10/2000 | McKiernan, Jr. | |
| D434,303 S | 11/2000 | DeCosta | |
| 6,158,828 A | 12/2000 | Vacovsky | |
| D436,841 S | 1/2001 | Carpenter | |
| 6,179,136 B1 | 1/2001 | Kluge | |
| 6,202,838 B1 | 3/2001 | Tran | |
| 6,279,862 B1 | 8/2001 | Gershowitz | |
| 6,286,802 B1 | 9/2001 | Munson | |
| 6,299,001 B1 | 10/2001 | Frolov | |
| 6,325,345 B1 | 12/2001 | Carpenter | |
| 6,351,905 B1 | 3/2002 | Dean | |
| 6,371,427 B1 | 4/2002 | Johnson | |
| 6,431,510 B1 | 8/2002 | Puritz | |
| D465,348 S | 11/2002 | Lucatello | |
| 6,478,273 B1 | 11/2002 | McKiernan, Jr. et al. | |
| 6,585,205 B2 | 7/2003 | Beaty | |
| 6,641,107 B1 | 11/2003 | Janssen | |
| 6,641,344 B2 | 11/2003 | Weiss | |
| D486,057 S | 2/2004 | Chen | |
| D494,452 S | 8/2004 | Sheldon et al. | |
| 6,775,935 B1 | 8/2004 | Cohen et al. | |
| 6,830,228 B2 | 12/2004 | Ernst | |
| 6,932,225 B2 | 8/2005 | Rowe | |
| D511,088 S | 11/2005 | Chiu | |

(56) References Cited

U.S. PATENT DOCUMENTS

| | | |
|---|---|---|
| D513,562 S | 1/2006 | Boffo |
| D515,911 S | 2/2006 | McDuff |
| 6,994,448 B1 | 2/2006 | Gorrell |
| D516,412 S | 3/2006 | McDuff |
| D517,344 S | 3/2006 | Zens |
| 7,086,543 B2 | 8/2006 | Remmers |
| 7,146,760 B2 | 12/2006 | Yiu |
| 7,210,243 B2 | 5/2007 | Schmidt |
| 7,216,841 B2 | 5/2007 | Dodig |
| 7,225,935 B2 | 6/2007 | Breymaier |
| D554,483 S | 11/2007 | Hager et al. |
| 7,395,998 B2 | 7/2008 | Peterson |
| 7,398,013 B2 | 7/2008 | He |
| 7,431,258 B2 | 10/2008 | Lamotta |
| 7,497,028 B2 | 3/2009 | Nevers et al. |
| 7,506,772 B2 | 3/2009 | Chen |
| D596,930 S | 7/2009 | Gaudron |
| 7,591,097 B2 | 9/2009 | Alman |
| D606,185 S | 12/2009 | Wefler |
| 7,669,723 B2 | 3/2010 | Kao |
| 7,694,401 B2 | 4/2010 | Peterson |
| 7,708,252 B2 | 5/2010 | Vander Berg et al. |
| 7,900,783 B2 | 3/2011 | Fernandez |
| D635,843 S | 4/2011 | McDuff et al. |
| D636,256 S | 4/2011 | McDuff et al. |
| 7,931,159 B2 | 4/2011 | Kao |
| D649,022 S | 11/2011 | McDuff et al. |
| D649,023 S | 11/2011 | McDuff et al. |
| D649,436 S | 11/2011 | McDuff et al. |
| D649,437 S | 11/2011 | McDuff et al. |
| D649,438 S | 11/2011 | McDuff et al. |
| D649,439 S | 11/2011 | McDuff et al. |
| D650,261 S | 12/2011 | McDuff et al. |
| 8,074,603 B2 | 12/2011 | Ohlman |
| 8,114,226 B2 | 2/2012 | Ernst et al. |
| 8,210,368 B2 | 7/2012 | Schwartzkopf |
| 8,272,610 B2 | 9/2012 | Ernst et al. |
| 8,308,116 B2 | 11/2012 | Daniels |
| 8,317,148 B2 | 11/2012 | Ernst et al. |
| D672,224 S | 12/2012 | Brinson et al. |
| 8,333,356 B2 | 12/2012 | Ernst et al. |
| 8,398,048 B2 | 3/2013 | Popkin et al. |
| 8,414,239 B2 | 4/2013 | McDuff |
| 8,434,629 B2 | 5/2013 | Fernanadez |
| 8,448,910 B2 | 5/2013 | Ernst et al. |
| 8,667,765 B1 | 3/2014 | McCarthy |
| 8,740,171 B2 | 6/2014 | Crescenzo |
| 8,757,570 B2 | 6/2014 | Ernst et al. |
| 8,813,404 B2 | 8/2014 | Goppion |
| 8,833,876 B2 | 9/2014 | Lee |
| 8,839,964 B2 | 9/2014 | Hawkins |
| 8,857,780 B1 | 10/2014 | Goss |
| D717,114 S | 11/2014 | Katterheinrich |
| 8,974,166 B2 | 3/2015 | McDuff |
| D731,716 S | 6/2015 | Kuiper |
| 9,044,110 B2 | 6/2015 | McDuff et al. |
| D744,773 S | 12/2015 | Yoon |
| 9,261,229 B2 | 2/2016 | Callif et al. |
| 9,296,552 B2 | 3/2016 | Schleuning |
| 9,307,837 B2 | 4/2016 | Wood |
| 9,380,885 B1 | 7/2016 | Nguyen |
| 9,496,695 B2 | 11/2016 | Battaglia |
| 9,563,078 B2 | 2/2017 | Ryu |
| 9,593,523 B1 | 3/2017 | Trimble |
| D783,907 S | 4/2017 | Ohlman |
| 9,668,596 B2 | 6/2017 | Crescenzo |
| D797,464 S | 9/2017 | Vitale |
| 9,775,450 B2 * | 10/2017 | Will .................. A47G 1/20 |
| 9,826,828 B1 | 11/2017 | Vaughan |
| D804,287 S | 12/2017 | Baldwin |
| 2002/0026736 A1 | 3/2002 | Spencer |
| 2002/0078583 A1 | 6/2002 | Richardson |
| 2002/0088912 A1 | 7/2002 | Yu |
| 2002/0182910 A1 | 12/2002 | Kiughadush |
| 2003/0071182 A1 | 4/2003 | Beaty et al. |
| 2003/0161680 A1 | 8/2003 | Suckow |
| 2003/0178545 A1 | 9/2003 | Ernst |
| 2004/0231218 A1 | 11/2004 | Dominioni |
| 2004/0261307 A1 | 12/2004 | Siegel |
| 2005/0000854 A1 | 1/2005 | Madigan |
| 2005/0279041 A1 | 12/2005 | Staples |
| 2006/0180557 A1 | 8/2006 | Weinstein |
| 2006/0182517 A1 | 8/2006 | McDuff |
| 2007/0006504 A1 | 1/2007 | Kao |
| 2007/0063119 A1 | 3/2007 | Huang |
| 2007/0084743 A1 | 4/2007 | Chu |
| 2007/0124910 A1 | 6/2007 | Peterson et al. |
| 2007/0194202 A1 | 8/2007 | Lamotta |
| 2007/0205344 A1 | 9/2007 | Liermann et al. |
| 2007/0235622 A1 * | 10/2007 | Baran .................. A47B 96/027 248/546 |
| 2007/0256850 A1 | 11/2007 | Hansen |
| 2008/0187688 A1 | 8/2008 | Gunther |
| 2008/0251682 A1 | 10/2008 | Repac |
| 2008/0283205 A1 | 11/2008 | Zimmer |
| 2008/0296456 A1 | 12/2008 | Lien |
| 2008/0302936 A1 | 12/2008 | Forbes et al. |
| 2009/0015121 A1 | 1/2009 | Sampson |
| 2009/0145804 A1 | 6/2009 | Kabel |
| 2009/0307953 A1 | 12/2009 | Ahlstrom |
| 2010/0084530 A1 | 4/2010 | Lai |
| 2010/0178448 A1 | 7/2010 | Nakajima |
| 2010/0213333 A1 | 8/2010 | Mejia et al. |
| 2010/0219312 A1 | 9/2010 | Johnson et al. |
| 2010/0300999 A1 | 12/2010 | Schwartzkopf |
| 2010/0326019 A1 | 12/2010 | Lofgren |
| 2011/0147236 A1 | 6/2011 | Johnson |
| 2011/0188250 A1 | 8/2011 | Waldhuetter |
| 2012/0001039 A1 | 1/2012 | McDuff et al. |
| 2012/0001040 A1 | 1/2012 | McDuff et al. |
| 2012/0056051 A1 | 3/2012 | Gold |
| 2012/0080343 A1 | 4/2012 | Gretz |
| 2012/0146470 A1 | 6/2012 | Katz |
| 2013/0105426 A1 | 5/2013 | Dyck |
| 2013/0105653 A1 | 5/2013 | Borys |
| 2014/0144055 A1 | 5/2014 | Byfield |
| 2014/0212602 A1 | 7/2014 | Thornton |
| 2014/0231604 A1 * | 8/2014 | Long .................. A47G 1/20 248/217.3 |
| 2014/0248105 A1 | 9/2014 | Namekawa |
| 2014/0259840 A1 | 9/2014 | Placko |
| 2014/0263122 A1 | 9/2014 | Roberts |
| 2014/0263924 A1 | 9/2014 | Crescenzo |
| 2014/0346310 A1 | 11/2014 | Yang |
| 2015/0060627 A1 | 3/2015 | Stauber |
| 2015/0308613 A1 | 10/2015 | Callif et al. |
| 2016/0029814 A1 | 2/2016 | Brown |
| 2017/0000270 A1 | 1/2017 | Will |
| 2017/0002973 A1 * | 1/2017 | Will .................. F16M 13/02 |
| 2017/0002974 A1 * | 1/2017 | Will .................. A47G 1/16 |
| 2017/0246526 A1 | 8/2017 | Brown |
| 2017/0347812 A1 | 12/2017 | Will |
| 2018/0100617 A1 | 4/2018 | Forrest |

FOREIGN PATENT DOCUMENTS

| | | |
|---|---|---|
| CN | 201351654 | 11/2009 |
| CN | 103702592 | 4/2014 |
| GB | 676903 | 8/1952 |
| WO | WO 1999/052741 | 10/1999 |
| WO | WO 2007/095351 A2 | 8/2007 |
| WO | WO 2015/150222 | 10/2015 |

OTHER PUBLICATIONS

List of Patents or Patent Applications Treated as Related, submitted herewith.

* cited by examiner

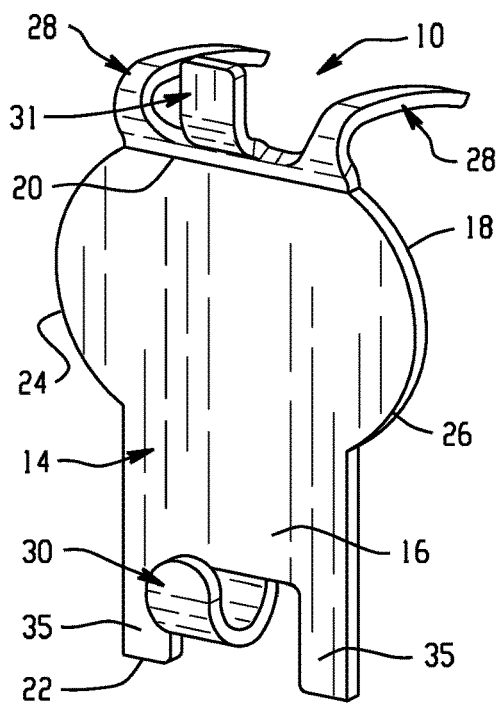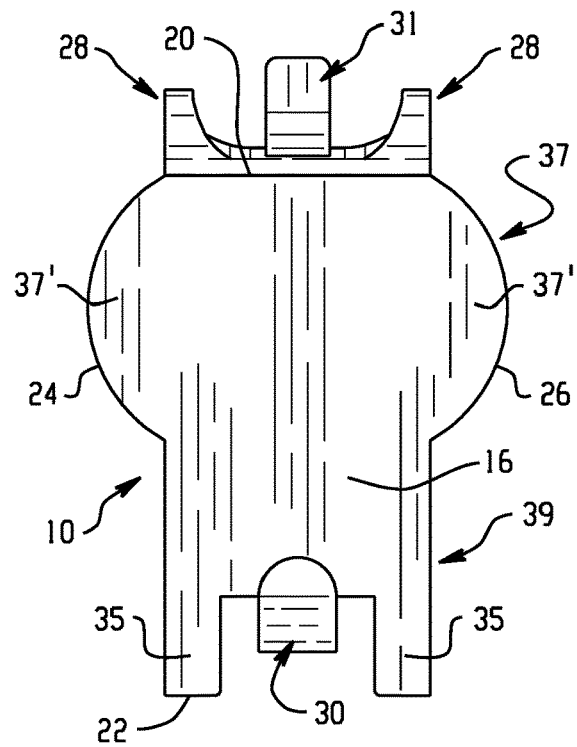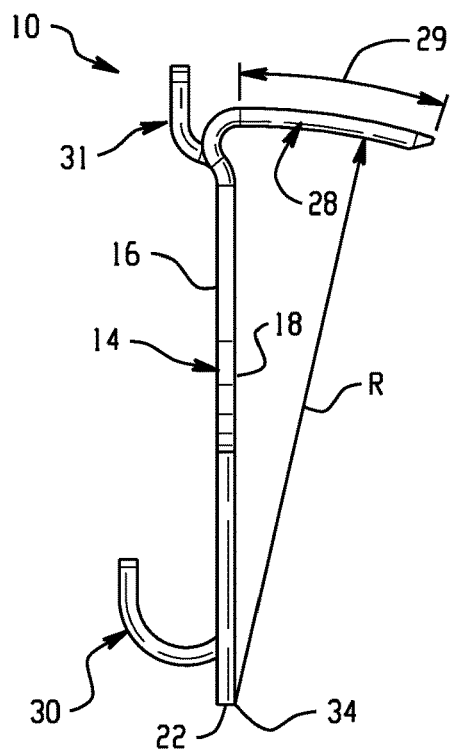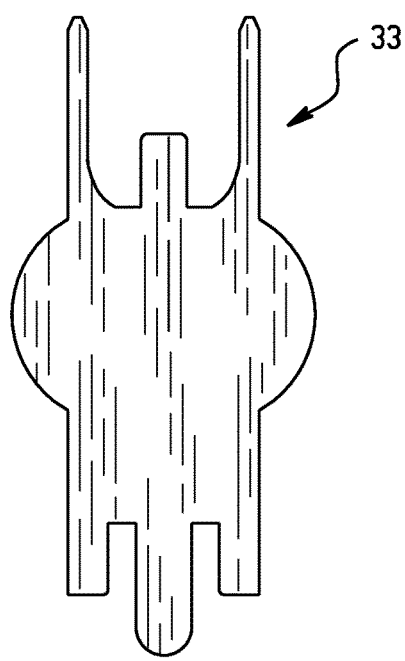
Fig. 1
Fig. 2
Fig. 3
Fig. 4

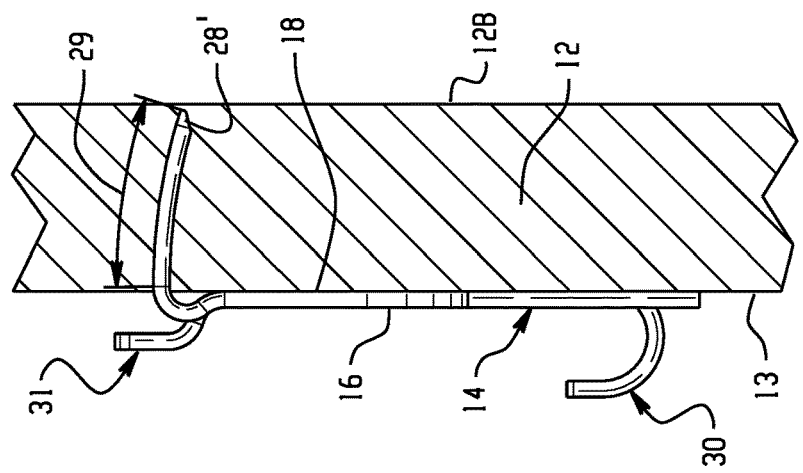
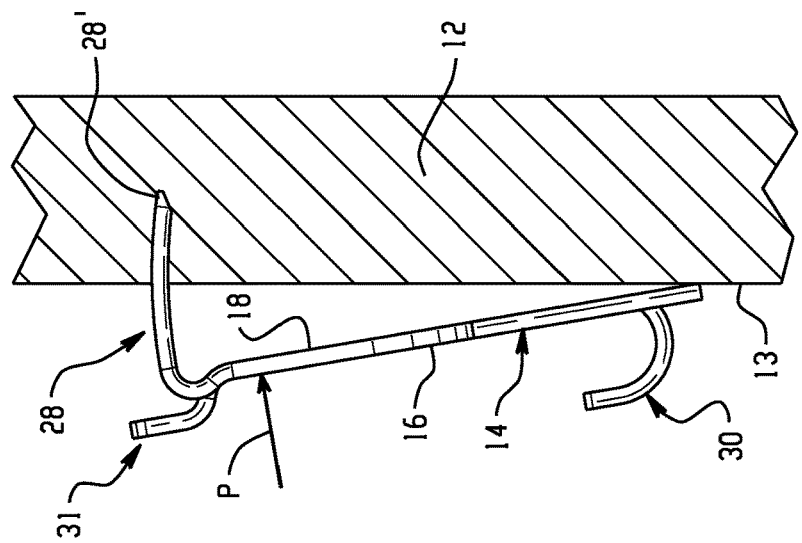
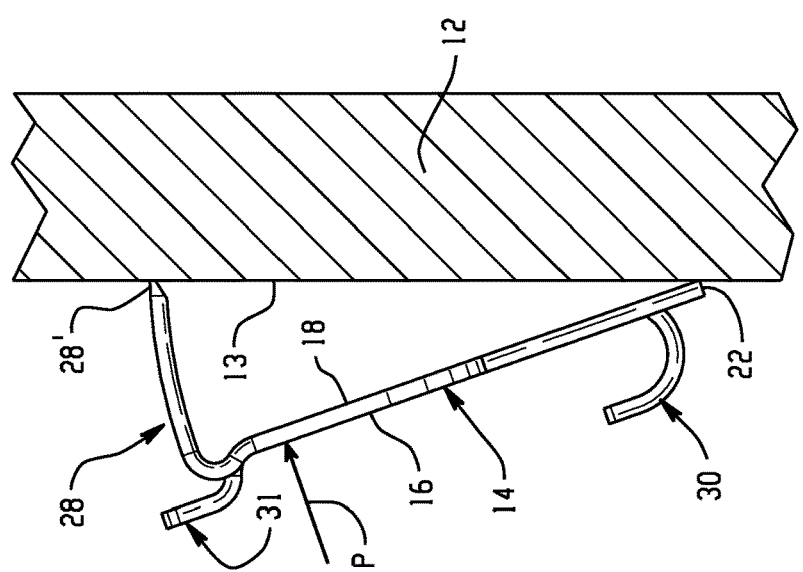

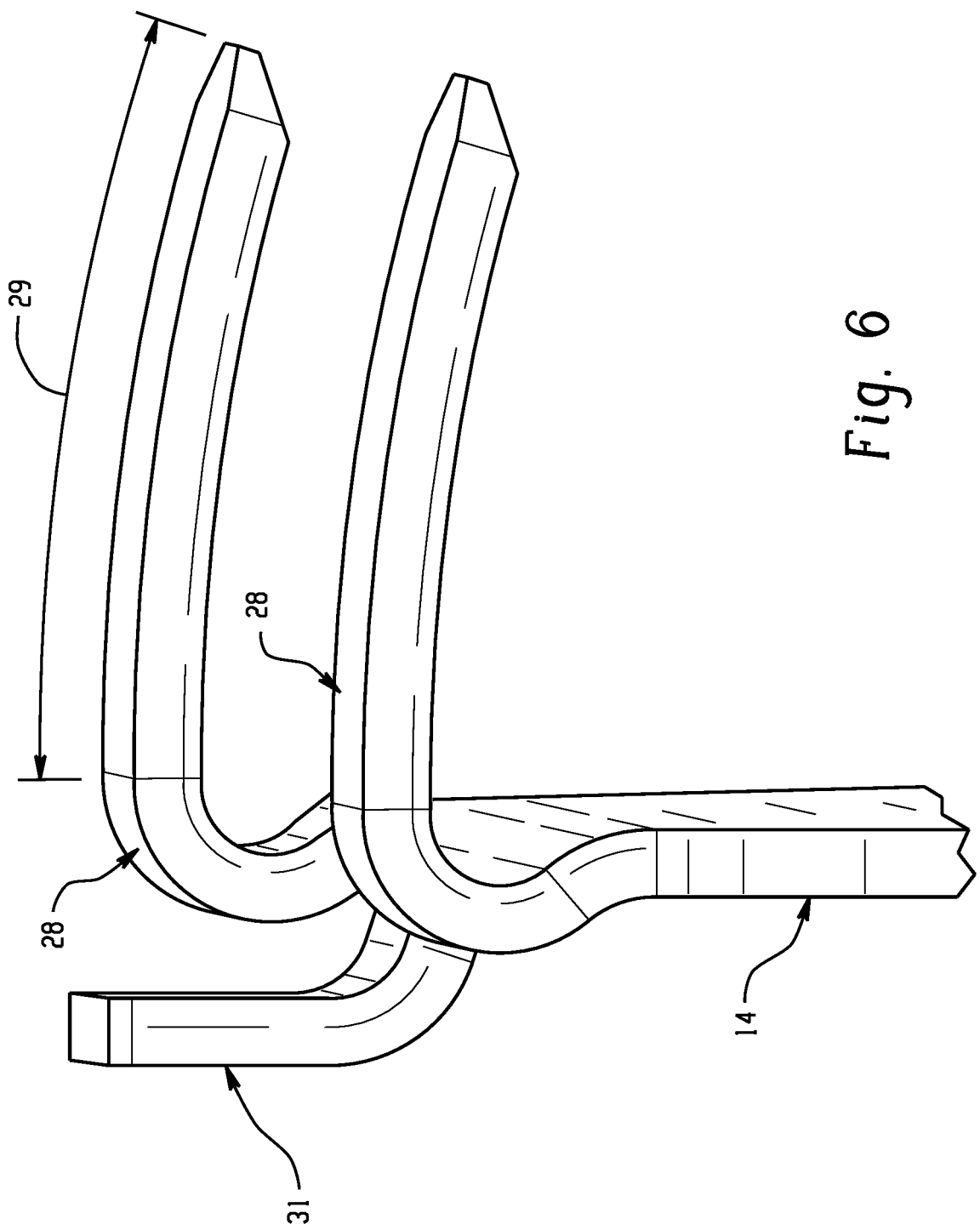

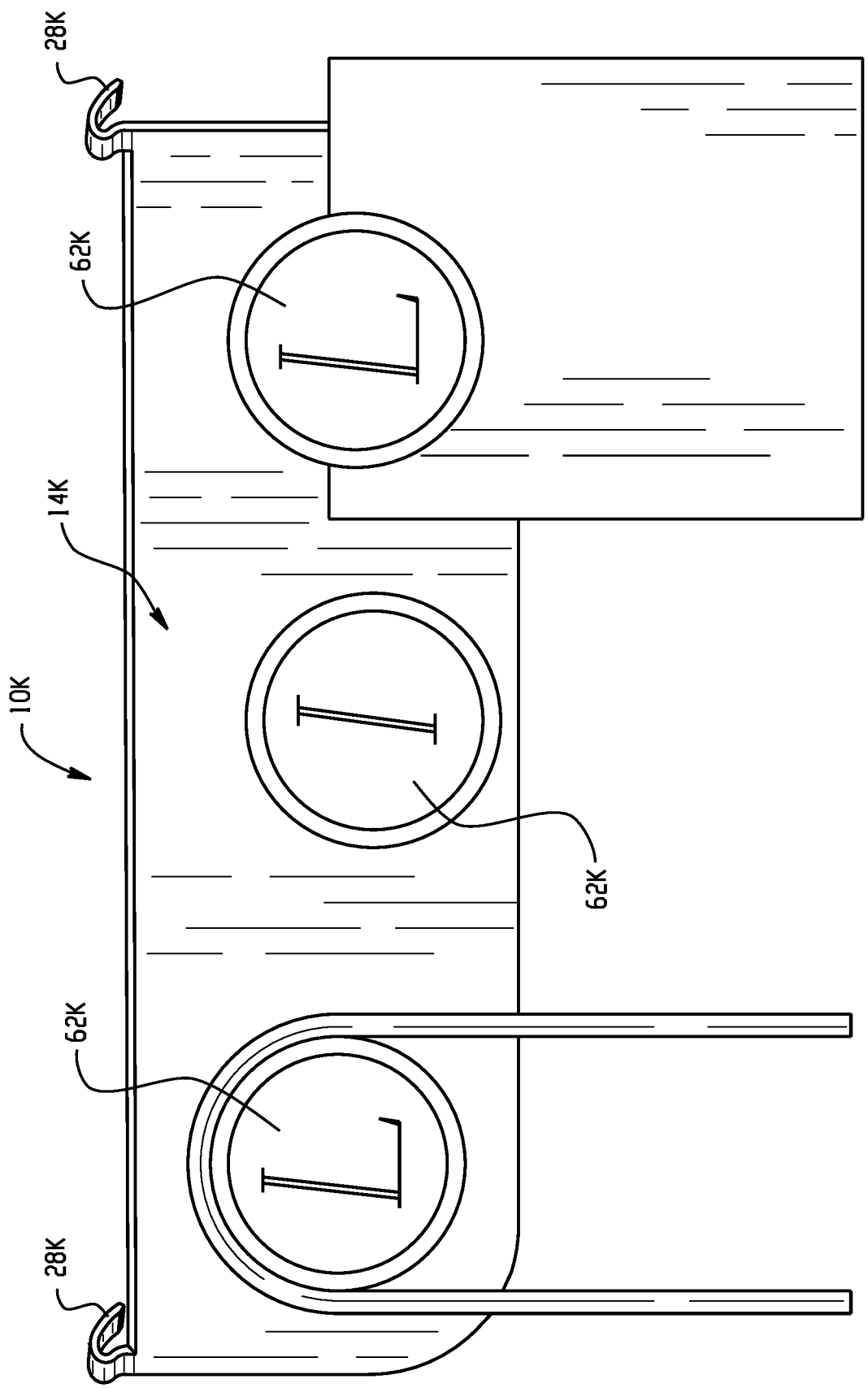

WALL ANCHORS

TECHNICAL FIELD

This application relates generally to wall anchors and related systems, methods and components.

BACKGROUND

Numerous products exist for installing a hook or hanging device in a wall, such as for hanging a picture frame, a mirror, or the like. Conventional nails and screws are not always convenient solutions and may not provide sufficient support strength in the wall, particularly in the case of drywall, or other friable wallboards, which are relatively weak.

Anchors incorporating curved saber tooth shaped retainers are known from U.S. Pat. Nos. 8,974,166 and 8,414,239. However, such anchors are still difficult for the typical homeowner to install and use properly because a hammer is generally needed to complete the anchor installation. These anchors also generally have a large wall penetration that tends to crumble and weaken the surrounding wall media adjacent the penetration and leave a large hole that is not easily repaired. It is also impractical to reposition these types of anchors after initial insertion in locations proximate the original hole for the purpose of making minor adjustments.

It would be desirable to provide an anchor device and related installation method that facilitates ease of installation, but at the same time results in an anchor with a high support strength and less damage to the wallboard, leaving relatively small holes upon anchor removal and therefore also permitting minor position adjustments if needed. To provide these advantages in connection with an anchor that installs without reference to stud or other supporting structure location and/or without concern for wires or pipes behind the wall, would also be beneficial.

SUMMARY

In one aspect, an anchor for hanging an object on a wall includes a base having front, back, top, bottom, left and right sides. At least one hook member extends forwardly from the base, and at least one wall penetrating retainer extends from the base. The wall penetrating retainer includes a wall penetrating extent that protrudes rearwardly of the base and has a curved configuration, and the wall penetrating extent has a substantially arcuate configuration. The base plate and the wall penetrating retainer are formed as a monolithic unit of metal plate construction and each of the base plate and wall penetrating retainer have a tensile yield strength of no less than 160 KSI and a minimum elongation of 3%.

In another aspect, an anchor for hanging an object on a wall includes a base having front and back sides. At least one wall penetrating retainer extends from the base. The wall penetrating retainer includes a wall penetrating extent that protrudes rearwardly of the base and has a substantially arcuate configuration. A distal side of the base defines a pivot axis about which the base can pivot when the distal side is positioned against a wall. A radius of curvature of the wall penetrating extent is located substantially proximate the pivot axis so as to facilitate rotational insertion of the wall penetrating retainer into the wall by a user manually applying force to the base without aid of a tool.

In a further aspect, an anchor for hanging an object on a wall includes a base having front and back sides. One or more wall penetrating retainers extend from the base. Each wall penetrating retainer includes a wall penetrating extent that protrudes rearwardly of the base and has a curved configuration. The wall penetrating extent of each wall penetrating retainer is sized and configured such that the anchor can be manually rotated into type X gypsum wallboard by positioning one side adjacent the wallboard and rotating the anchor toward the wallboard to simultaneously move each wall penetrating extent into the wallboard with a force of no more 15 pounds per retainer normal to the base at a location of the wall penetrating retainer.

In yet another aspect, an anchor for hanging an object on a wall includes a base having front and back sides. One or more wall penetrating retainers extends from the base. Each wall penetrating retainer includes a wall penetrating extent that protrudes rearwardly of the base and has a curved configuration. Each wall penetrating extent has a respective cross-sectional area in a cross-section that is taken perpendicularly to a lengthwise axis of each wall penetrating extent at any location along the wall penetrating extent, and a total retainer cross-sectional area of the one or more wall penetrating extents is no more than about 5 $mm^2$.

In still another aspect, an anchor for hanging an object on a wall includes a base having front and back sides. One or more wall penetrating retainers extends from the base. Each wall penetrating retainer includes a wall penetrating extent that protrudes rearwardly of the base and has a curved configuration. One or more portions of the back side of the base lie in a wall mount plane for abutting a wall surface when the anchor is installed. A perpendicular distance between the wall mount plane and a distal end of each wall penetrating retainer is between about 0.44 inches and about 0.50 inches for assuring that when the anchor is installed on a front side of a wallboard that is ½ inch thick the wall penetrating retainer will approach but not pass through a back side of the wallboard so as to limit an install force required for the anchor.

In a further aspect, an anchor and wallboard assembly includes a wallboard having a front face and a back face, and an anchor installed on the front face of the wallboard. The anchor includes a base having front and back sides, and one or more wall penetrating retainers extending from the base. Each wall penetrating retainer includes a wall penetrating extent that protrudes rearwardly of the base and has a curved configuration. A distal end of the wallboard penetrating retainer is positioned proximate to the back face of the wallboard but does not pass through the back face.

In still a further aspect, an anchor for hanging an object on a wall includes a base having front and back sides, and at least one wall penetrating retainer extending from the base. The wall penetrating retainer includes a wall penetrating extent that protrudes rearwardly of the base and has a curved configuration. The wall penetrating extent includes a convex curved surface separated form a concave curved surface, and lateral first and second side surfaces that are substantially planar and that extend between the convex curved surface and the concave curved surface. A distal end of the wall penetrating extent is shaped to provide a point, where the point is defined at least in part by a bevel extending from the concave surface toward the point and little or no bevel extending from the convex surface toward the point to thereby place the point radially closer to the convex surface.

In another aspect, an anchor for hanging an object on a wall includes a base having front, back, top, bottom, left and right sides. Left and right wall penetrating retainers extend from the base, each wall penetrating retainer including a wall penetrating extent that protrudes rearwardly of the base and has a curved configuration. The base includes a head portion and a body portion, where a lateral width of the head portion is greater than a lateral width of the body portion. The head portion is located between the left and right wall penetrating retainers and the body portion.

In another aspect, an anchor for hanging an object on a wall includes a base, and first and second wall penetrating retainers extending from the base. Each wall penetrating retainer includes a wall penetrating extent that protrudes rearwardly of the base and has a curved configuration. The base includes a plate having a first thumb capture zone and a second thumb capture zone, where the first thumb capture zone is positioned toward the first wall penetrating retainer such that an install force applied by a first user thumb at the first thumb capture zone is substantially directed to the first wall penetrating retainer, and the second thumb capture zone is positioned toward the second wall penetrating retainer such that an install force applied by a second user thumb at the second thumb capture zone is substantially directed to the second wall penetrating retainer.

In another aspect, an anchor for hanging an object on a wall includes a base, and at least one wall penetrating retainer extending from the base. The wall penetrating retainer includes a wall penetrating extent that protrudes rearwardly of the base and has a curved configuration. The base includes a head portion and a body portion, with the head portion located between the wall penetrating retainer and the body portion. The body portion includes a pair of spaced apart stabilizing legs extending away from the wall penetrating retainer.

In another aspect, an anchor for hanging an object on a wall includes a base having front and back sides. At least one wall penetrating retainer extends from the base, where the wall penetrating retainer includes a wall penetrating extent that protrudes rearwardly of the base and has a curved configuration. The wall penetrating retainer departs from one edge of the base with an initial forward progression and then turns back to define the wall penetrating extent.

In another aspect, an anchor for hanging an object on a wall includes a base having front and back sides, and at least one wall penetrating retainer extending from the base. The wall penetrating retainer includes a wall penetrating extent that protrudes rearwardly of the base and has a curved configuration. A first hook element extends forwardly from a lower portion of the base, and a second hook element protrudes forwardly from an upper portion of the base.

In another aspect, an anchor for hanging an object on a wall includes a base having front, back, top, bottom, left and right sides. At least first and second wall penetrating retainers extend from the base, each wall penetrating retainer including a wall penetrating extent that protrudes rearwardly of the base and has a curved configuration. The front side of the base includes at least first and second forward protruding hook elements. The base is formed as an elongated panel with the first and second wall penetrating retainers laterally spaced apart toward the left and right sides of the panel and with the first and second hook elements laterally spaced apart toward the left and right sides of the panel.

In another aspect, an anchor for hanging an object on a wall includes a base having front, back, top, bottom, left and right sides. At least one wall penetrating retainer extends from the base and includes a wall penetrating extent that extends rearwardly of the base and has a downwardly curved configuration. The front side of the base includes at least one forward protruding hook element. The base includes a plate having a substantially planar front surface portion, where a substantial majority of the hook element in front elevation view is located outside of a perimeter of the planar front surface portion to enable clear viewing of an image located on the planar front surface portion.

In another aspect, an anchor for hanging an object on a wall includes a base having front, back, top, bottom, left and right sides. At least one wall penetrating retainer extends from the base and includes a wall penetrating extent that extends rearwardly of the base and has a downwardly curved configuration. The front side of the base includes at least one forward protruding hook element. The base includes a plate having a substantially planar front surface portion with a surface area of at least 35 square inches, and the front surface portion comprises one of a mirror surface or an eraseable whiteboard type surface.

In another aspect, an anchor for hanging an object on a wall includes a base having front, back, top, bottom, left and right sides. At least one wall penetrating retainer extends from the base and includes a wall penetrating extent that extends rearwardly of the base and has a downwardly curved configuration. The front side of the base includes at least one forward protruding hook element. The base includes a plate having a substantially planar front surface portion with a surface area of at least 16 square inches, where the plate is formed of a magnetic material, and one or more detachable magnets are magnetically attached to the front surface portion.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1-4 show views of one embodiment of a wall anchor;

FIGS. 5A-5C depict progressive installation of the wall anchor of FIGS. 1-4;

FIGS. 6 and 7 show enlarged views of the retainers of the wall anchor;

FIG. 21 depicts another embodiment of an anchor;

DETAILED DESCRIPTION

Figure 7:
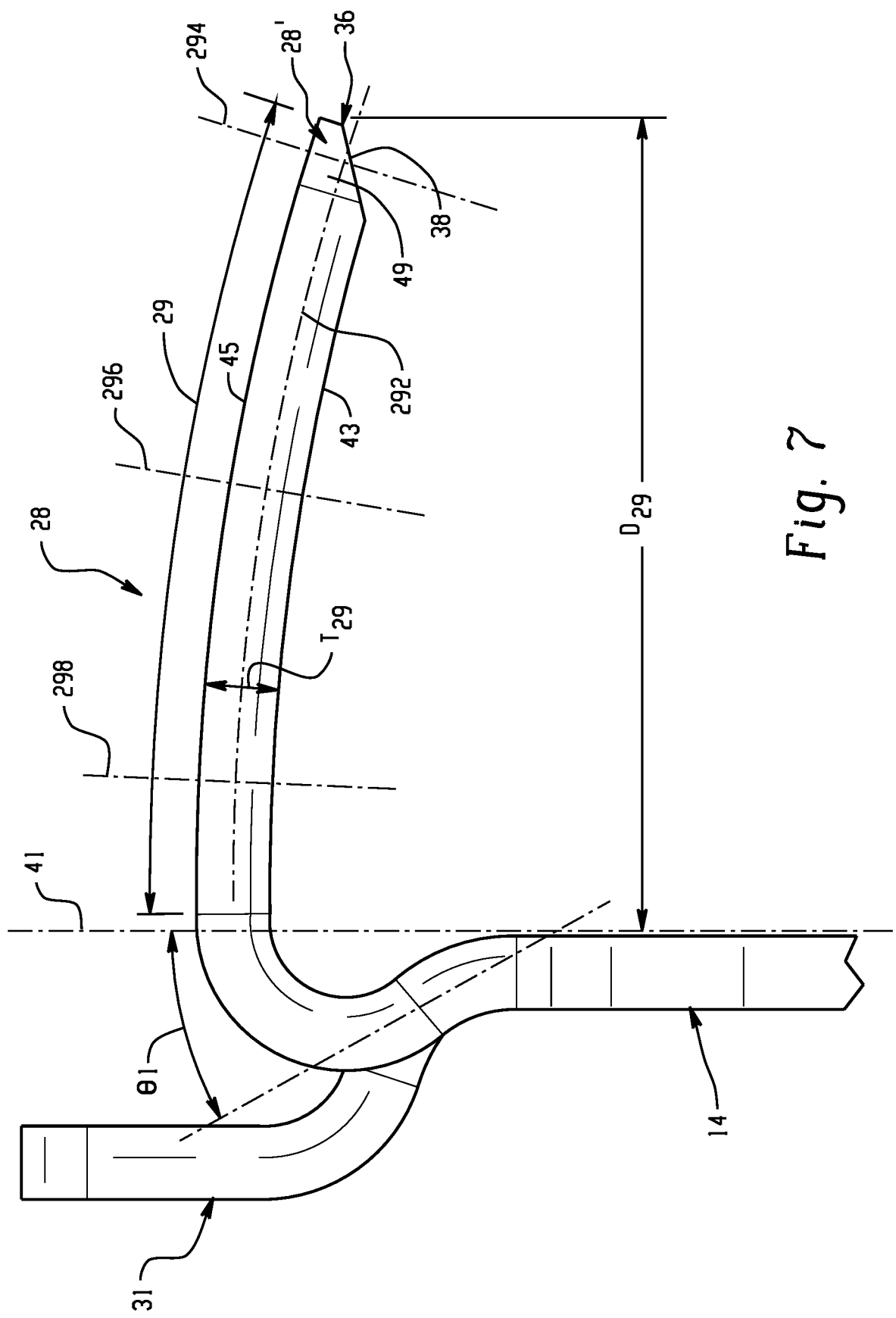

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-4, a wallboard anchor 10 is shown and includes a base 14 having front 16, back 18, top 20, bottom 22, left 24 and right 26 sides. In the illustrated configuration the base 14 is formed by a base plate (e.g., metal plate), the front side 16 and back side 18 are formed by the substantially planar front and rear surfaces of the base plate, and the top side 20, bottom side 22, left side 24 and right side 26 are formed by respective edges of the base plate. However, it is recognized that different configurations for the base 14 are possible as will be evident from other embodiments described below.

A pair of spaced apart wall penetrating retainers 28 extend from the base, each having a corresponding rearwardly protruding wall penetrating extent 29 with a primarily downwardly curved configuration as will be described in greater detail below. The front side 16 of the base 14 includes a lower forward protruding hook element 30 and an upper forward protruding hook element 31. The upper hook element 31 defines an upper most portion of the anchor, and both the upper and lower hook elements 30, 31 are both substantially centered laterally on the base 14. As best seen in FIG. 3, the lower hook element 30 protrudes forward of the base 14 by a distance that is greater than the distance that the upper hook element 31 protrudes forward of the base 14. It is contemplated that the upper hook element may be primarily used for engaging with a sawtooth type picture hanger bracket that is typically mounted at the upper rear edge of a picture frame, and therefore placement of the relatively high placement of the hook element 31 on the base assures that no portion of the anchor will be visible when the anchor is used for such purpose. The lower hook element may more typically be used for picture hanging via engagement with a picture hanging wire.

In the embodiment of anchor 10, both the wall penetrating retainers 28 and the hook elements 30, 31 are formed monolithic with the plate material of the base plate (e.g., utilizing a progressive stamping operation). In this regard, FIG. 4 shows a flat pattern view of the anchor plate material 33 before bending or stamping. In the illustrated anchor 10, each of the two retainers 28 and the two hooks 30 and 31 are formed by appropriately bent portions of metal plate and depart from an external peripheral side edge of the base plate of the anchor.

In one implementation, the metal plate may be cold rolled alloy sheet steel (e.g., AISI 4130 per ASTM A506/507) with a thickness of between about 0.040 inches and about 0.052 inches (e.g., no more than 0.052 inches), and the resulting anchor may have a tensile yield strength of no less than 160 KSI and a minimum elongation of 3%. By making use of this ultra-high strength steel a thinner plate material can be utilized to achieve a desired load rating, enabling reduced cross-sectional size of the wall penetrating retainers in order to reduce required insertion force and minimize wall damage. The elongation characteristic assures adequate ductility after hardening.

In other embodiments reference below, one or both of the wallboard penetrating retainers 28 and/or the hook elements 30, 31 could initially be formed as separate components that are later attached to the base 14 (e.g., by welding).

The general manner of use of the anchor 10, which is also applicable to the other anchor embodiments described herein, is shown with reference to FIGS. 5A-5C. In particular, in order to install the anchor 10 in the wallboard 12, the anchor 10 is manually positioned with the bottom side 22 of the base adjacent the front surface 13 of the wallboard 12, with the distal ends 28' of the wall penetrating retainers 28 at the front surface 12 as shown in FIG. 5A. The anchor 10 can be stably held by a user in this position with two hands gripping the right and left sides of the base 14 proximate the top side of the base with the user's thumbs at the front side of the base. By manually applying pressure P to the front side of the base, primarily by pushing with the user's thumbs, the anchor 10 is then rotated into the wallboard 12 so that the wall penetrating retainers 28 pierce and moves into the wallboard (per FIG. 5B) until the back side of the base 14 seats against the front surface 13 of the wallboard 12 as shown in FIG. 5C. Items can then be hung from either of the hook elements 30, 31 of the anchor 10.

Notably, as mentioned above, the wall penetrating extent of each retainer 28 has a primarily downwardly curved configuration. In this regard, the wall penetrating extents may have a substantially arcuate configuration and be substantially identical in shape and size. The radius of curvature R (see FIG. 3) defined by the arcuate extents 29 has a center point 34 that is substantially proximate the bottom side 22 of the base 14. In particular, the center point 34 of the radius of curvature R should desirably be positioned at a rear, bottom corner of the base where the bottom side of the base meets the back side of the base as shown, which aligns the center point 34 with a pivot axis about which the anchor pivots during install. This geometry minimizes the energy and force required to insert each set of retainers, minimizes damage to the wall and results in small wall surface perforations when the anchor is removed. In one implementation, the radius of curvature R of the wall penetrating extents of the retainers is between about 1.20 inches and about 1.45 inches While the foregoing description of anchor installation contemplates a particular orientation of the anchor within the wall, it is recognized that the anchor (or other anchor embodiments) could be installed offset from vertical. In such cases side 22 of the anchor may be referenced as the distal side of the anchor, which is spaced from the retainers and about which pivot occurs for installation purposes.

Regardless of installation orientation, in the illustrated anchor 10 the bottom or distal side 22 is formed by the aligned distal ends of spaced apart stabilizing legs 35, where hook element 30 is disposed between the two stabilizing legs and is spaced apart from each of the stabilizing legs. The stabilizing legs 35 extend away from the locations of wall penetrating retainers 28 and can provide for better seating of the distal side against an uneven wall surface (e.g., a wall surface that has been textured). Each stabilizing leg is also substantially aligned laterally with a respective one of the wall penetrating retainers.

In the illustrated anchor 10, and as best seen in FIG. 2, the base 14 includes an upper head portion 37 and a lower body portion 39 (e.g., formed in part by the legs 35), where a lateral width of the head portion is greater than a lateral width of the body portion, and the head portion 39 is located between the wall penetrating retainers 28 and the body portion 39. The head portion 37 includes left and right side lobes or ears 37', which extend laterally outward beyond the lateral location of the respective left and right retainers 28. The two lobes form respective left and right thumb capture zones (e.g., proximate the upper left and right corners or regions of the anchor base where the retainers are located) that enable an install force applied by a user's thumbs to be substantially directed to the retainers 28 (e.g., an install force applied at the left thumb capture zone is substantially directed to the left wall penetrating retainer and an install force applied at the right thumb capture zone to be substantially directed to the right wall penetrating retainer). Each thumb capture zone may also be formed with an indentation, embossment and/or stamped outline.

Referring now primarily to FIGS. 6 and 7, in the illustrated embodiment, each wall penetrating 28 retainer departs base with an initial forward progression reflected by angle $\Theta 1$ and then turns back (e.g., with the illustrated relatively sharp curve) to define a rearward and downward progression along the wall penetrating extent 29 (e.g., having a primary arcuate shape as described above). By way of example, angle $\Theta 1$ (e.g., taken relative to a plane parallel to a wall mount plane 41 at the back side of the base) may be between about 3 degrees and about 30 degrees (such as between about 10 degrees and about 20 degrees or between about 15 degrees and about 25 degrees), though variations are possible. The initial forward progression can be achieved by a slight forward bend in the entire top edge of the base as shown, or can be achieved by having only the retainers bend forward as they leave the top edge of the base plate. This forward progression feature is advantageous because it provides clearance for a generous bend retainer radius at the juncture of the retainer and the base plate to prevent stress cracking at this point of maximum bending load while assuring that when fully inserted the rear side of the base plate can land flush with the wall. In this regard, the initial portion of each wall penetrating retainer 28 that is forward of the back side of the base curves forward and then curves rearward as shown, and a radius of curvature at every point along the initial portion may no less than 100% (e.g., no less than 125%) of the plate thickness. The wall penetrating extent 29 of each retainer extends generally from the wall mount plane 41 to the distal end of the retainer, where the wall mount plane 41 is defined by one or more portions of the back side of the base that will abut a planar wall surface when the anchor is installed. In the illustrated embodiment the back side/rear surface of substantially planar (except for the portion included in the forward bend at the top side) such that substantially the entire base plate lies in and defines the wall mount plane 41, but in other variations a set of discrete portions of the back side of the retainer could lie in and define the wall mount plane.

Notably, the initial forward progression feature described above also displaces or offsets the retainers from the base. In fact, in the illustrated embodiment although the wall penetrating extents 29 are located rearward of the base, the extents 29 are not located directly behind the base, which aids in pull-out retention by providing a greater vertical distance between the retainers and the bottom side of the base about which an installed anchor will seek to pivot when loaded. The initial forward progression of the top side of the base can also provide a small gap between the top side of the base and the wall which can function as a removal tab feature into which, for example, a screwdriver can be inserted in order to pry the anchor out of a wall. Such a forward bend or protruding part along all or part of the top side of the base could be provided separately from the forward progression of the retainers (e.g., in the form of a smaller version of hook element 31) to act as a removal tab feature.

In order to facilitate anchor installation, the wall penetrating retainers 28 can also be configured with other advantageous features.

For example, to facilitate manual wallboard penetration and passage without tools, utilizing thumb force only (e.g., applied at the thumb capture zones), the wallboard penetrating retainers 28 may be formed with a relatively smooth external surface finish (e.g., achieved by polishing, painting or plating). In this regard, the surface of the wallboard penetrating retainers 28 can be manufactured with or modified to a maximum average surface roughness of about 20 µinch (e.g., in some cases n a maximum average surface roughness of about 15 µinch). In one implementation, just the wallboard penetrating extent of each wallboard penetrating retainers is worked, processed or otherwise formed to achieve this desired low surface roughness feature in order to reduce manufacturing cost. The latter implementation would reduce install force but maintain friction on the rougher portions of the penetrating retainer to resist removal forces. The retainers may have a polished surface finish and/or a plated surface finish and/or a painted finish and/or a lubricant (e.g., Teflon) incorporated into the surface finish.

Figure 8:
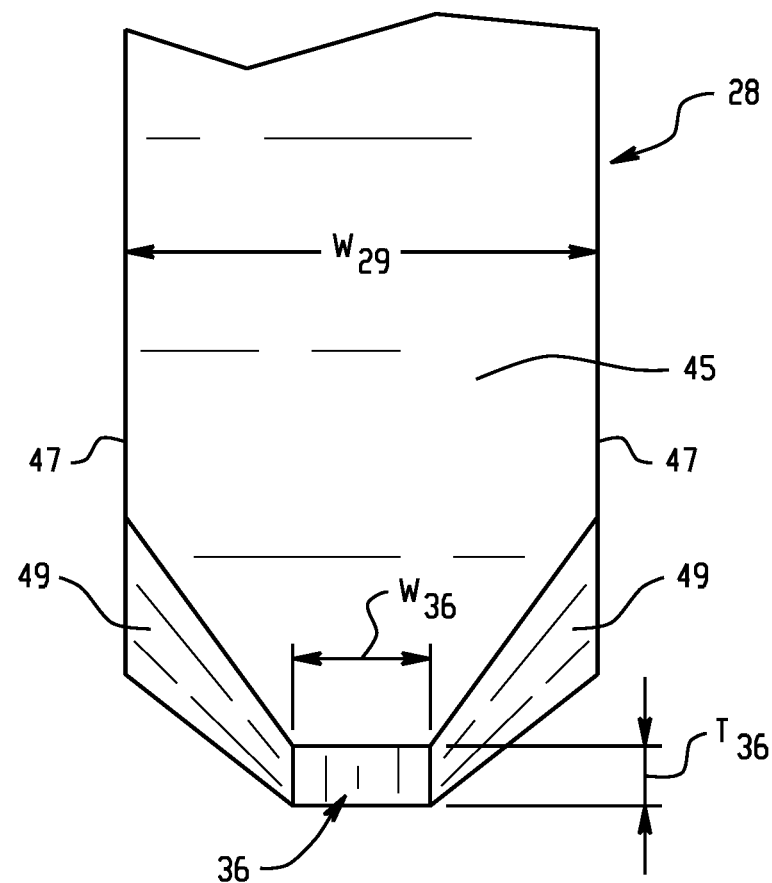
FIG. 8 shows a partial end view of one retainer of the wall anchor.

Referring to FIGS. 7 and 8, the distal end 28' of each wallboard penetrating retainer 28 includes a pointed tip that is shaped to provide a point 36 when viewed in cross-section taken along a vertical plane running along a length of the wallboard penetrating retainer, where the point 36 is defined by a bevel 38 at a bottom side of the distal end of the wallboard penetrating retainer. In particular, in the illustrated side elevation it is seen that the wall penetrating extent 29 includes a concave curved surface 43 separated form a convex curved surface 45, and lateral an opposed side surfaces 47 that are substantially planar and that extend between the convex curved surface and the concave curved surface. The bevel 36 extends from the concave surface 43 toward the point 36 and little or no bevel extends from the convex surface 45 toward the point 36, to thereby place the point 36 closer to the convex surface of the wall penetrating extent. This type of beveled point is advantageous because the applicants have discovered that including a bevel at the top side of the wallboard penetrating retainer disadvantageously creates a reaction force with the wallboard material that tends to cause the bottom side of the base plate to be pivoted out away from the front surface of the wallboard. Side bevels 49 may also be optionally incorporated to achieve the point 36 as shown. In one implementation, a lateral width $W_{36}$ of the point is no more than 35% of a lateral width $W_{29}$ of a major portion of the wall penetrating extent, and a thickness $T_{36}$ of the point is no more than about 40% of a thickness $T_{29}$ of the major portion of the wall penetrating extent.

Figure 9:
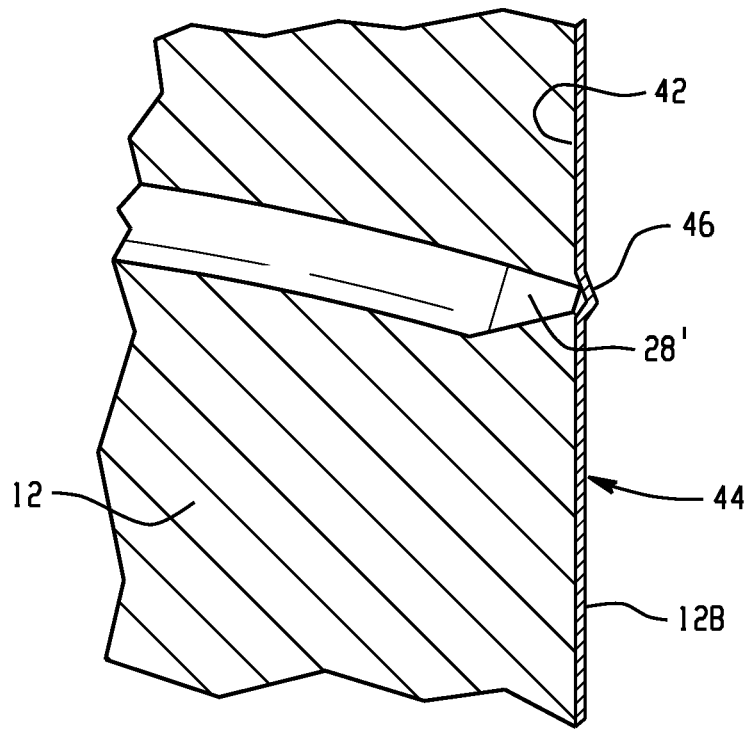
FIG. 9 shows an enlarged view depicting one orientation of the distal end of a retainer as installed in ½ inch wallboard.

In this regard, proper sizing of the wallboard penetrating retainer(s) can also be used to achieve more user friendly performance of an anchor. In particular, and referring again to FIG. 5C, it is seen that in some implementations when the anchor 10 is installed at the front surface of the wallboard, the distal ends 28' of the wallboard penetrating retainers 28 may be positioned proximate to a wallboard rear surface 12B without passing through the rear surface. Referring to FIG. 9, in some arrangements of this type, the distal end 28' of the wallboard penetrating retainer actually contacts an internal side 42 of the paper layer 44 that defines the rear surface of the wallboard but, again, does not pass through the paper layer 44. The distal end of the wallboard penetrating retainer may even cause a localized rearward protrusion 46 in the paper layer 44 at a point of contact with the paper layer but, again, without passing through the paper layer 44. Arrangements of this type, in which the wallboard penetrating retainer is in contact with or proximate the paper layer 44 defining the rear surface 12B without passing through that paper layer are advantageous in that applicants have discovered that it can take five pounds or more of additional force to install an anchor if the distal ends of the retainers must pass through rear paper layer 44 in order to achieve final anchor seating position. For the general consumer/home/residential application, the majority of drywall is ½ inch thick, and therefore the retainers can be sized with this in mind. In such cases, a perpendicular distance D29 of the wall penetrating extent 29 between the wall mount plane 41 and the point at the distal end of the wall penetrating retainer can be no more than 0.50 inches (e.g., between about 0.44 inches and about 0.50 inches for assuring that when the anchor is installed on a wallboard that is ½ inch thick the wall penetrating retainer will approach but not pass through a back side of the wallboard). Of course, in some embodiments the retainers could be longer and pierce the back paper layer of the wallboard.

Generally, by properly selecting the cross-sectional size and number of wall penetrating retainers used and/or by incorporating one or more of the above wall penetrating retainer features, the anchor can be manually inserted into type X gypsum wallboard (with physical characteristics per the ASTM C1396—Standard Specification For Gypsum Board) by positioning the bottom (or distal) side adjacent the wallboard and rotating the anchor upward to move the wallboard penetrating member into the wallboard with a force P (FIGS. 5A and 5B) of no more than 15 pounds per retainer normal to the base plate at the retainer location when the distal ends 28' of the retainer do not penetrate the rear side of the wallboard per design. Measurement of the level of insertion force required can be achieve utilizing a force gage mounted to a rotating fixture so that the measured pressure or force "P" is always proximate to the penetrating retainer(s) and normal to the base plate at the retainer location, with a rotational installation speed of about 2.0 seconds where the starting point of rotation is with the distal end(s) of the retainer(s) against the wallboard and the ending point of rotation corresponds to final seating of the anchor. In anchor embodiments having a single retainer (contemplated below), the installation force to final seating of the anchor should typically be 15 pounds total or less. In anchor embodiments having two retainers, the total installation force to final seating of the anchor should typically be 30 pounds total or less. In either case, the required total level of force can advantageously be achieved without the use of tools.

In one example, such low insertion forces for the retainer(s) of a given anchor may be achieved where the retainers have pointed distal ends as described above and a generally uniform cross-section along the remainder of the wall penetrating extent of the retainer, where an area of the cross-section is no more than about 2.5 mm². In one example, in the case retainers of rectangular cross-section as suggested in anchor 10, the main segment of the wall penetrating extent of each retainer may be on the order of 0.042 inches by 0.068 inches (e.g., 0.042 inches thick and 0.068 inches wide), resulting in a cross-sectional area of about 0.00286 in² (about 1.845 mm²). In another example, the main segment of the wall penetrating extent may have a rectangular cross-section on the order of 0.050 inches by 0.075 inches (e.g., 0.050 inches thick and 0.075 inches wide), resulting in a cross-sectional area of about 0.00375 in² (about 2.419 mm²). Regardless of whether one or multiple retainers are used, it may be advantageous (e.g., for the purpose of ease of install and/or for the purpose of limiting wall damage) to assure that the total retainer cross-sectional area (e.g., the cross-sectional area of one retainer if only one is used or the total cross-sectional area of two retainers if two retainers are used) is no more than about 5 mm² (about 0.008 square inches, or in some cases no more than about 6 mm²), where the cross-section of each wall penetrating extent of the retainer is taken perpendicularly to a lengthwise axis 292 (FIG. 7) of the retainer (which axis is curved like the retainer) and is taken at any location along a length of the wall penetrating extent 29 that will embed within a wall (e.g., a cross-section in any of planes 294, 296 or 298). This arrangement facilitates installation and reduced wall hole size that must be repaired after anchor removal.

Advantageously, such retainer sizes, combined with a radius of curvature as described above, provide desired low insertion forces, while at the same time resulting in both relatively small penetration holes in the wallboard and relatively high hanging load capability (e.g., in excess of 30 pounds for one retainer or in excess of 60 pounds for two retainers). Thus, the anchor can be installed without the use of tools (e.g., by user thumb force to rotate the anchor) and provide a very beneficial load support capability once installed. Moreover, upon removal of the anchor from the wall the size of the hole(s) that are left for repair will be small, which (i) makes it simpler for the novice homeowner to make a clean wall repair and (ii) more readily allows for slight repositioning of the anchor (e.g., in close proximity to the existing holes) if needed.

Figure 10:
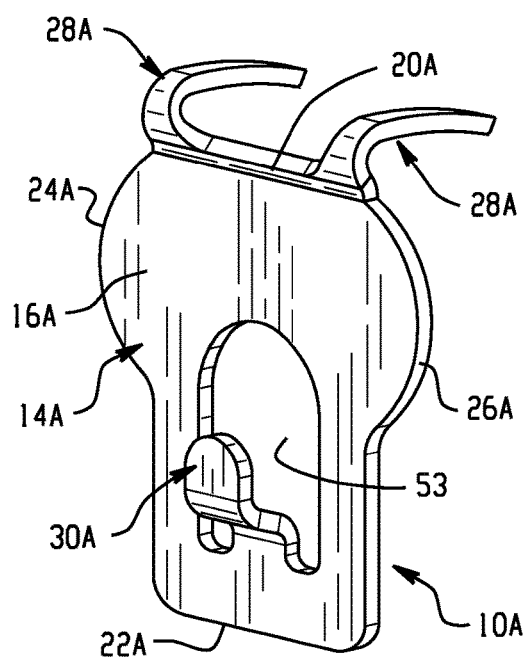
FIGS. 10-12 depict another embodiment of an anchor.
Figure 11:
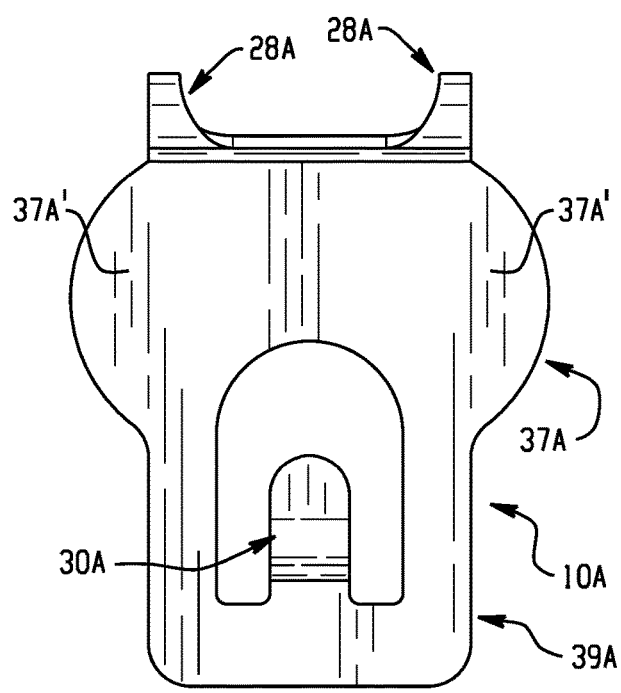
Figure 12:
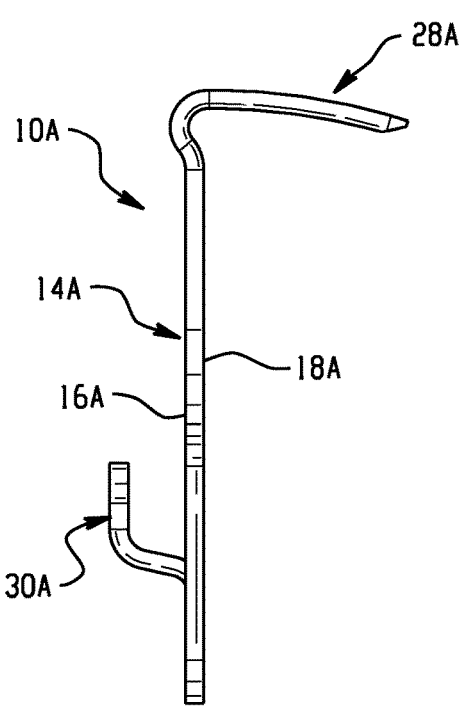

Referring now to FIGS. 10-12, another embodiment of an anchor 10A is shown, where the anchor includes base 14A with front 16A, back 18A, top 20A, bottom 22A and left 24A and right 26A sides, laterally spaced apart wall penetrating retainers 28A and a single hook element 30A. Notably, base 14A includes a lower body portion 39A, an enlarged head portion 37A with side lobes 37A' to facilitate thumb placement, and the retainers 28A include features similar to those described above for the retainers 28 of anchor 10. The anchor 10A is also of metal plate construction, with retainers 28A and hook element 30A formed monolithic with the base plate. In this regard, hook element 30A is formed of appropriately bent plate material that departs from an edge of the internal periphery of a base plate cut-out or opening 53 that is fully surrounded or bounded by base plate material.

Other anchor configurations are possible.

Figure 13:
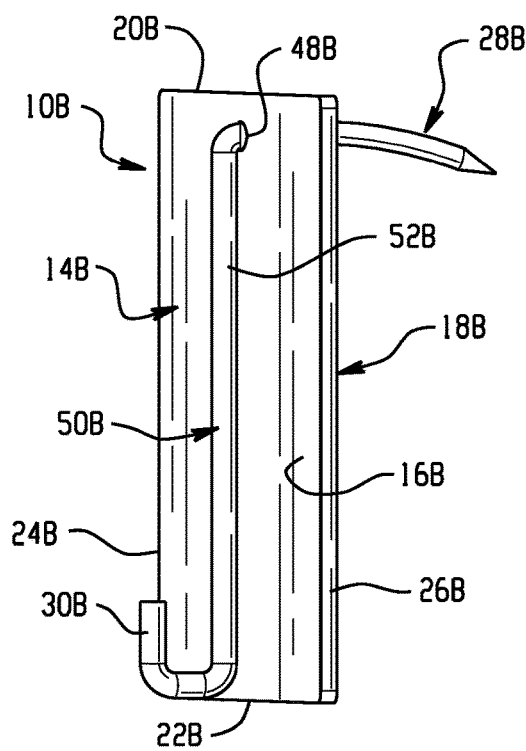
FIG. 13 depicts another embodiment of an anchor.

Referring to FIG. 13, an anchor 10B is shown and includes a base 14B with front 16B, back 18B, top 20B, bottom 22B, left 24B and right 26B sides. The base is formed of plate structure having generally planar front and back surfaces, with an opening 48B initially formed through an upper portion of the plate. A single wallboard penetrating retainer 28B (e.g., arcuate at the back side of the base with a radius of curvature having a center point at the rear corner where the bottom side meets the back side) and hook element 30B are initially formed as a separate component, in this case a wire form member 50B, with the wallboard penetrating retainer 28B at the top of the wire form member and the hook element 30B at the bottom of the wire form member. A connecting part 52B of the wire form member 50B extends vertically between the wallboard penetrating retainer 28B to the hook element 30B. As shown, when assembled, wallboard penetrating retainer 28B passes through the plate opening 48B (thus closing the opening) so as to extend from the back side 18B of the base. The wire form member turns abruptly at the front side 16B of the base and then connecting part 50B extends downward along the front side 16B of the base, with the hook element 30B formed by one or more bends at the bottom of the wire form member. The wire form member may be welded to the base to achieve final working assembly. In this regard, the rear side of the connecting part of the wire form member may be flattened to provide a substantially planar rear seating surface that sits flushly against the front side of the base, facilitating both a welding operation and general stability of the mount of the wire form member 50B to the base 14B. In other possible implementations the wire form member may be of generally rectangular cross-sectional configuration, although fully round cross-sections are also possible. Although it is generally contemplated that both the base 14B and wire form member 50B of the anchor 10B would be of metal (e.g., spring steel), it is recognized that the wire form member could be of metal and the base 14B of suitable plastic such as polycarbonate, nylon or ABS.

Figure 14:
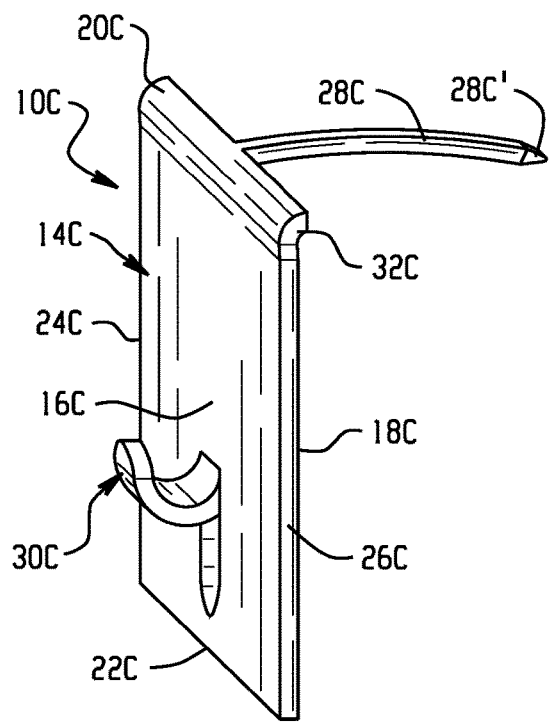
FIG. 14 depicts another embodiment of an anchor.

Referring to FIG. 14, a further embodiment of an anchor 10C is shown and includes a base 14C having front 16C, back 18C, top 20C, bottom 22C, left 24C and right 26C sides. In the illustrated configuration the base 14C is formed by a base plate (e.g., metal plate such as spring steel), the front side 16C and back side 18C are formed by the front and rear surfaces of the base plate, and the top side 20C, bottom side 22C, left side 24c and right side 26C are formed by respective edges of the base plate. However, it is recognized that different configurations for the base 14A are possible. A single rearwardly extending wallboard penetrating retainer 28C has a primarily downwardly curved configuration (e.g., arcuate as described above) and pointed distal end 28C'. The front side 16C of the base 14C includes a forward protruding hook element 30C. In this embodiment, both the wallboard penetrating retainer 28C and the hook element 30C are formed monolithic with the plate material of the base plate (e.g., utilizing a progressive stamping operation). In this embodiment, the base 14C includes a slight rearward projection or lip 32C and the wallboard penetrating retainer 28C extends from a rearward face of the lip 32C.

Figure 15:
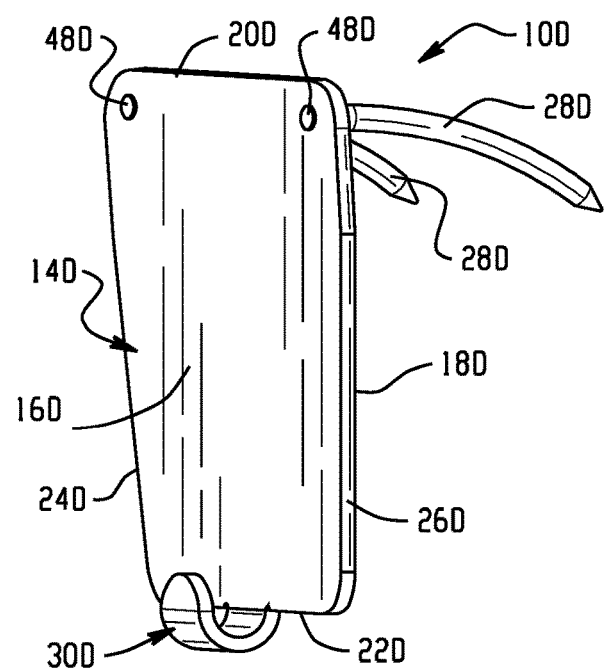
FIG. 15 depicts another embodiment of an anchor.

FIG. 15 depicts an anchor 10D with base having front 16D, back 18D, top 20D, bottom 22D, left 24D and right 26D sides, where with the hook element 30D extends from the bottom side of the base 14D, where the base 14D is of plate configuration and two spaced apart retainers 28D are provided of wire form configuration. The retainers 28D have an end weld connection to the base plate (e.g., the plate includes openings 48D into which the ends of the retainers 28D extend for the purpose of carrying out the weld, resulting in closure of the openings 48D). In an alternative configuration the retainers could simply be CD stud welded to the rear side of the base plate.

Figure 16:
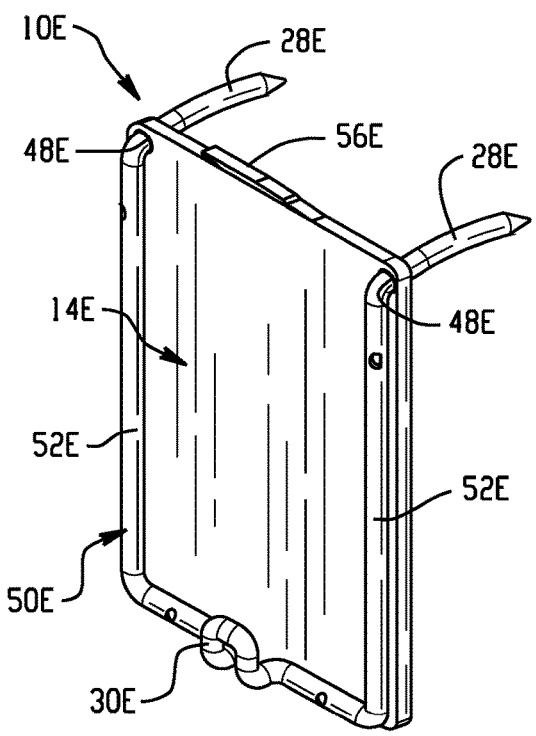
FIG. 16 depicts another embodiment of an anchor.

FIG. 16 depicts an anchor 10E similar in form to anchor 10B above, except that wire form member 50E is formed to include two wallboard penetrating retainers 28E and two connecting parts 52E that move toward each other toward the bottom of the base and meet to produce the hook element 30E. The base 14E initially includes two openings 48E, one for each retainer. The top side of the base 14E includes a removal tab 56E that is forwardly offset from the back side 18E of the base, which will provide an accessible space between the removal tab 56E and the wall when the anchor is inserted into the wall, such that a tool, such as a screwdriver, can be used to initiate rotation of the anchor out of the wall by insertion in the space. This removal tab feature can be incorporated into the other anchors as well.

Figure 17:
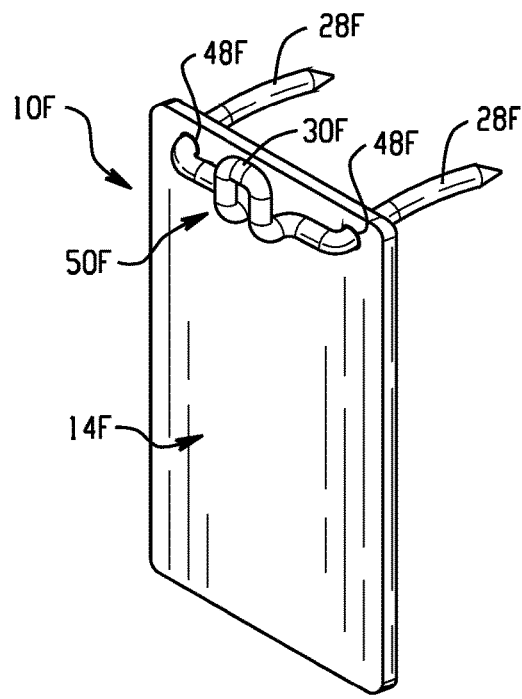
FIG. 17 depicts another embodiment of an anchor.

In the anchor 10F of FIG. 17 the wire form member 50F is formed to include two retainers 28F that pass through and close respective base openings 48F, with the hook element 30F located at the top side of the base.

Other anchor variations are possible, and a wide variety of uses for such anchors are possible.

Figure 18:
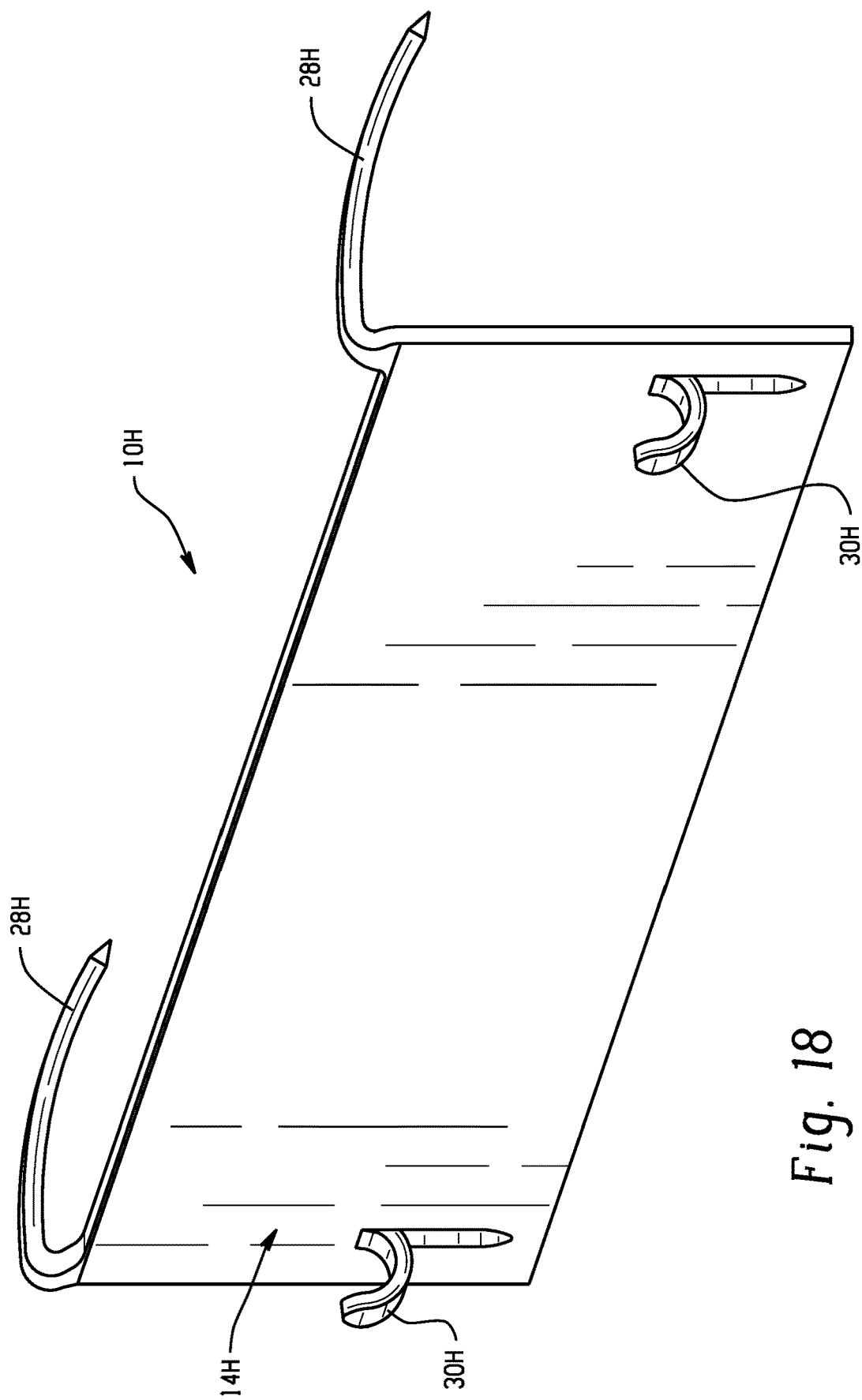
FIG. 18 depicts another embodiment of an anchor.
Figure 19A:
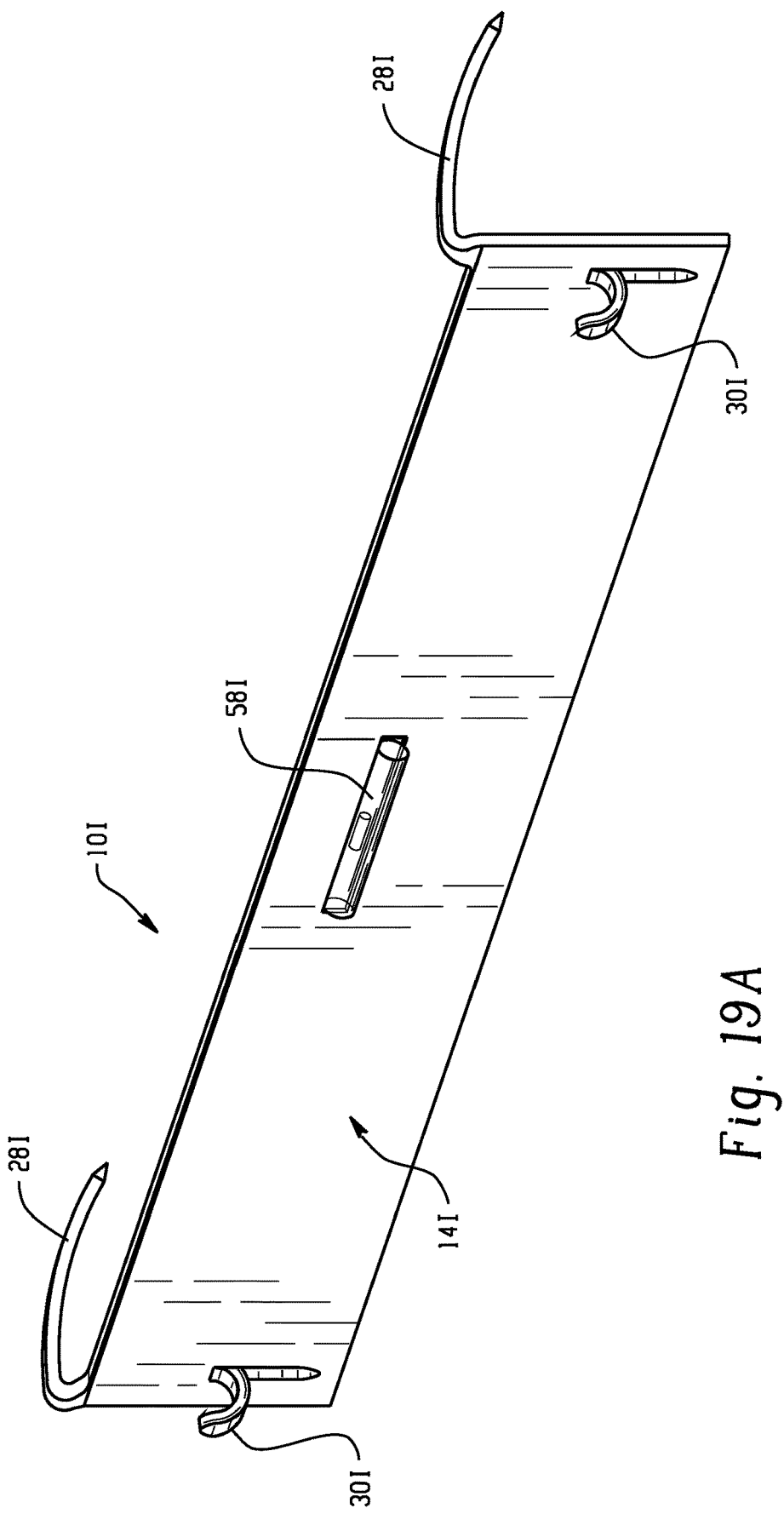
FIGS. 19A-19B depict another embodiment of an anchor.
Figure 19B:
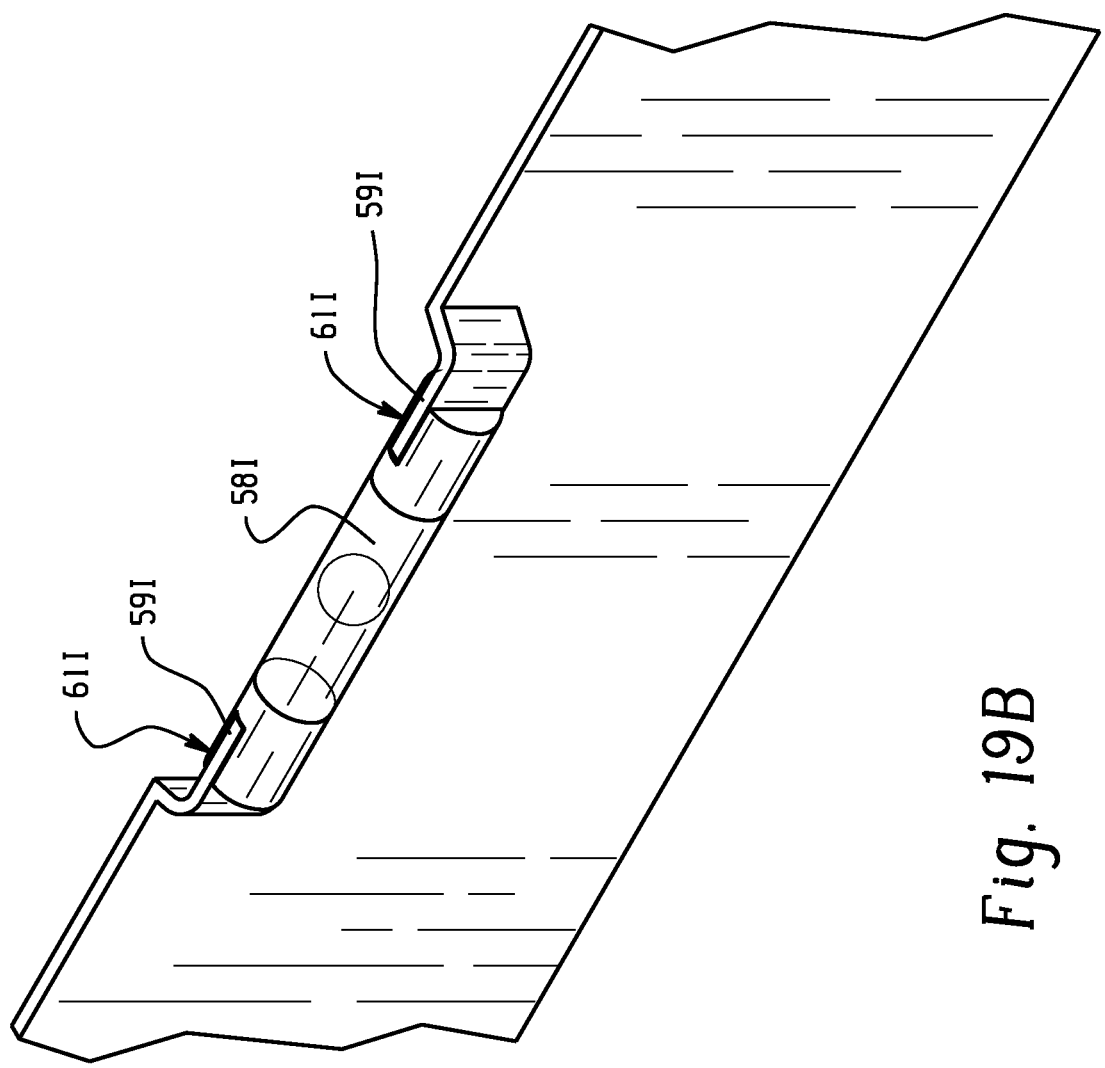

By way of example, referring to FIG. 18, an anchor 10H is formed by an elongated (e.g., at least 5 inches wide, such as at least 10 inches wide) base 14H (e.g., of metal plate construction here) with spaced apart wallboard penetrating retainers 28H and corresponding spaced apart hook elements 30H. Use of spaced apart hook elements in this manner provides the ability to more readily assure level hanging of an item such as a picture using a wire attached to the back of the picture. FIGS. 19A and 19B shows a similar elongated/wide anchor 10I with dual retainers 28I and dual hook elements 30I, but with a level (e.g., a spirit or bubble level) 58I mounted to the base 14I. By way of example, a base plate may be formed with a through slot 60I and the lateral edges of the through slot may include tabs that engage side tabs on the level. One or both of the sets of tabs may provide some flex to facilitate installing the level. In another implementation shown in FIG. 19B, the top side of the base is formed with a gap between two opposed forwardly offset lips 59I, and each end of the level 58I includes a slot 61I that slidably engages a respective tab 59I (e.g., in a friction fit arrangement). In an alternative arrangement, the level could be magnetically attached to the base. The hook elements could be at other heights along the base as well.

Figure 20:
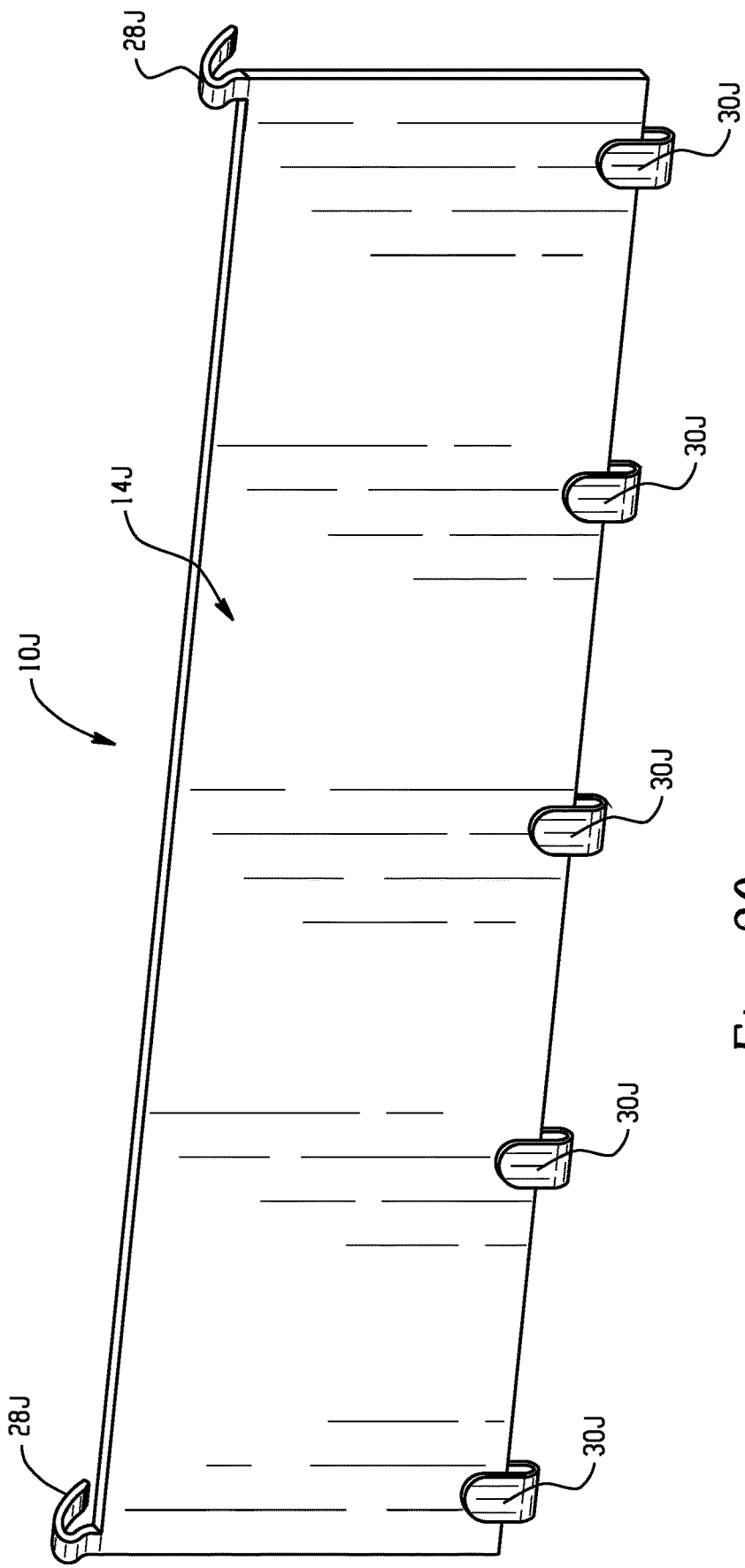
FIG. 20 depicts another embodiment of an anchor.

FIG. 20 shows an elongated anchor 10J with base 14J having spaced apart retainers 28J and multiple hook elements 30J at the bottom side of the base (e.g., to act as key ring holders). In some implementations such an anchor 14J may be formed with a substantially planar front surface portion with a relatively large, useable surface (e.g., at least 35 square inches, or at least 50 square inches, or at least 90 square inches). The front surface portion can be formed with a mirror surface or an eraseable whiteboard type surface. A substantial majority of the hook element(s) in front elevation view may be located outside of a perimeter of the planar front surface portion to enable clear viewing of an image located on the planar front surface portion (e.g., a mirror image or writing on a whiteboard-type surface, or even a permanent, applied graphic).

FIG. 21 shows an elongated anchor 10K with base 14K having spaced apart retainers, which may or may not incorporate any hook elements, used in combination with magnets 62K that can be used to post notes or other items to the anchor base 14K (which is formed of magnetic material). In this case a front surface area of at least 16 square inches (e.g., at least 20 square inches or at least 35 square inches) may provide suitable area for magnetic attachment purposes.

Other features can be incorporated into anchors as well. For example, the bottom side of the anchor base may be formed with a rearwardly protruding edge or lip (e.g., the edge or lip protrudes no more than 1.5 mm) in order to assure that when an item is hung on the anchor the majority of the reaction force to anchor pull out is located at the bottom side of the base rather than being distributed across the entire vertical extent of the back side of the base.

Figure 22A:
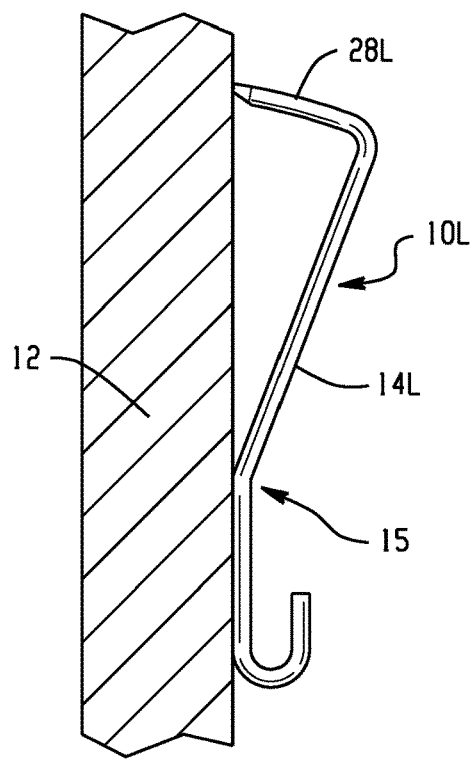
FIGS. 22A and 22B depict another embodiment of an anchor.
Figure 22B:
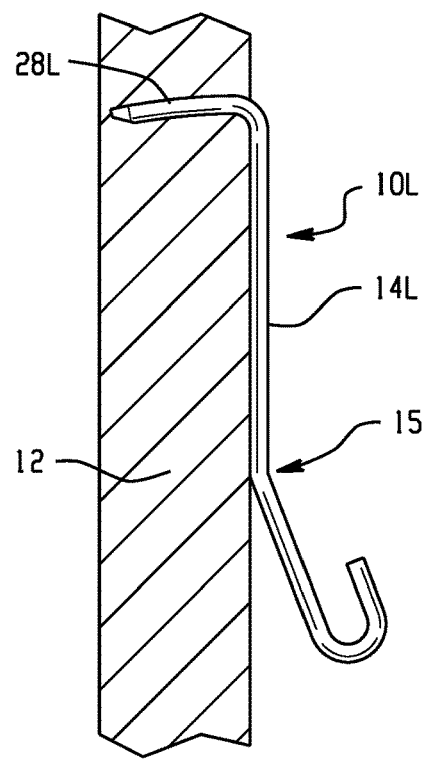

Referring to FIGS. 22A and 22B, an anchor 10L includes a base 14L with a forward bend 15 between upper and lower portions of the base. For purposes of installation, as seen in FIG. 22A the lower portion seats flush against a wall surface when the distal end of the wall penetrating retainer 28L is in contact with the wall surface to define a ready to install position. The lower portion of the base then protrudes away from the wall after the anchor has been installed as shown in FIG. 22B.

Figure 23:
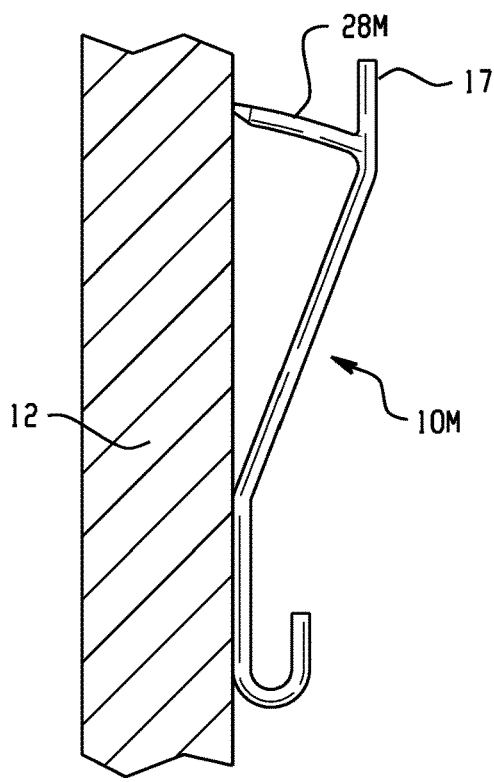
FIG. 23 depicts another embodiment of an anchor.

FIG. 23 shows an anchor 10M in which a flat strike zone 17 (e.g., parallel to the wall surface when the anchor is in the ready to install position) is provided at the top of the base for embodiments in which a hammer might be used to move the wall penetrating retainer(s) 28M into the wall.

Figure 24:
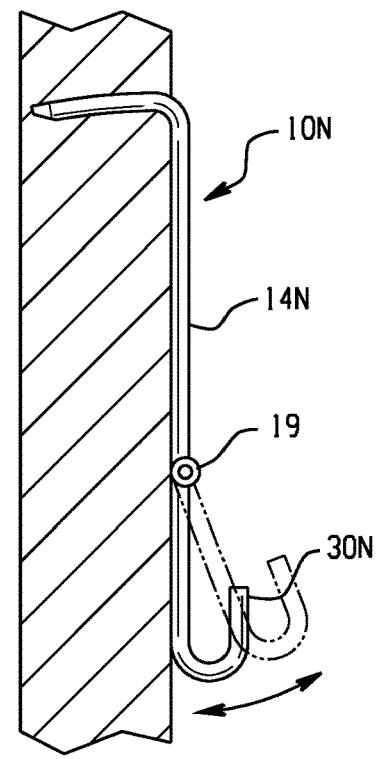
FIG. 24 depicts another embodiment of an anchor.

FIG. 24 shows an anchor 10N in which the hook element 30N is hingedly connected with the base 14N via hinge feature 19. A detent could be incorporated in the hinge feature that would maintain an angle between the hook element 30N and the base 14N for both installation and then to facilitate picture hanging. The weight of a picture pulling on the hook element 30N would overcome the force of the detent and allow the hook element to lay flat against the wall.

It is to be clearly understood that the above description is intended by way of illustration and example only, is not intended to be taken by way of limitation, and that other changes and modifications are possible. For example, in some cases the anchors could be formed with snap in place retainers (e.g., wire form retainers that snap into place on metal or plastic base) or the anchors could be produced using an overmold process (e.g., an overmold to connect retainers to a plastic base or an overmold of the metal base of a metal base and retainer combination). Moreover, while the embodiments above show a single hook on the base plate, or in the case of multiple hooks all such hooks located at the same height on the base plate, it is recognized that configurations in which the base plate includes vertically spaced apart hooks (e.g., 2 or more) are possible. The plate-type anchor (with or without hook(s)) could also be incorporated into more complex anchor assemblies, such assemblies with additional components, in which case the base plate could be installed into the wall in a different orientation (e.g., with retainers curving laterally within the wall instead of vertically downward). In addition, the anchors could be used in wood and masonry wall materials by predrilling small holes with a template and pushing the retainers into the holes.

What is claimed is:

1. An anchor for hanging an object on a wall, comprising:
 a base having front, back, top, bottom, left and right sides, at least one hook member extends forwardly from the base, at least one wall penetrating retainer extending from the base, the wall penetrating retainer including a wall penetrating extent that protrudes rearwardly of the base and has a curved configuration, the wall penetrating extent has a substantially arcuate configuration, wherein the base plate and the wall penetrating retainer are formed as a monolithic unit of metal plate construction and each of the base plate and wall penetrating retainer have a tensile yield strength of no less than 160 KSI and a minimum elongation of 3%;
 wherein a center of a radius of curvature of the wall penetrating extent is located substantially at a rear corner of the base where the bottom side of the base meets the back side of the base.

2. The anchor of claim 1 wherein a radius of curvature of the wall penetrating extent is between 1.20 inches and 1.45 inches.

3. The anchor of claim 2 wherein the wall penetrating retainer is a first wall penetrating retainer, the wall penetrating extent is a first wall penetrating extent, the anchor further includes a second wall penetrating retainer extending from the base, the second wall penetrating retainer spaced laterally from the first wall penetrating retainer, the second wall penetrating retainer including a second wall penetrating extent that protrudes rearwardly of the base and has a curved configuration, wherein the second wall penetrating extent has an arcuate configuration, wherein the first wall penetrating extent and the second wall penetrating extent are substantially identical in shape and size.

4. An anchor for hanging an object on a wall, comprising:
 a base having front and back sides, at least one wall penetrating retainer extending from the base, the wall penetrating retainer including a wall penetrating extent that protrudes rearwardly of the base and has a substantially arcuate configuration, a distal side edge of the base defines a pivot axis about which the base can pivot when the distal side is positioned against a wall, and a center point of a radius of curvature of the wall penetrating extent is located in substantial alignment with the pivot axis so as to facilitate rotational insertion of the wall penetrating retainer into the wall;
 wherein the base comprises a plate having a first thumb capture zone and a second thumb capture zone, the wall penetrating retainer is a first wall penetrating retainer, the anchor further includes a second wall penetrating retainer extending from the base, the second wall penetrating retainer spaced from the first wall penetrating retainer, wherein the first thumb capture zone is positioned toward the first wall penetrating retainer such that an install force applied by a first user thumb at the first thumb capture zone is substantially directed to the first wall penetrating retainer, and the second thumb capture zone is positioned toward the second wall penetrating retainer such that an install force applied by a second user thumb at the second thumb capture zone is substantially directed to the second wall penetrating retainer;
 wherein the first thumb capture zone extends laterally outward beyond a lateral location of the first wall penetrating retainer and the second thumb capture zone extends laterally outward beyond a lateral location of the second wall penetrating retainer.

5. The anchor of claim 4 wherein the pivot axis is located substantially at a rear corner of the base where the distal side of the base meets the back side of the base.

6. The anchor of claim 4 wherein the radius of curvature of the wall penetrating extent is between 1.20 inches and 1.45 inches.

7. The anchor of claim 4 wherein the wall penetrating retainer is a first wall penetrating retainer, the wall penetrating extent is a first wall penetrating extent, the anchor further includes a second wall penetrating retainer extending from the base, the second wall penetrating retainer spaced from the first wall penetrating retainer, the second wall penetrating retainer including a second wall penetrating extent that protrudes rearwardly of the base and has a substantially arcuate configuration, where a radius of curvature of the second wall penetrating extent is substantially equal to the radius of curvature of the first wall penetrating extent.

8. The anchor of claim 4 wherein the distal side of the base is defined by a pair of spaced apart legs having aligned distal ends.

9. The anchor of claim 8 wherein the pivot axis is substantially aligned with a rear corner of each of the aligned distal ends.

10. The anchor of claim 4 wherein the wall penetrating extent includes a maximum average surface roughness of no more than 20 μinch.

11. The anchor of claim 10 wherein the wall penetrating extent has at least one of a polished surface finish, a plated surface finish, a painted finish, or a lubricant incorporated into its surface finish.

12. The anchor of claim 4 wherein the first thumb capture zone is formed as a first ear-shaped portion of the plate and the second thumb capture zone is formed as a second ear-shaped portion of the plate.

13. The anchor of claim 4 wherein one or more portions of the back side of the base lie in a wall mount plane for abutting a wall surface when the anchor is installed, and wherein a perpendicular distance between the wall mount plane and a distal end of the wall penetrating retainer is no more than 0.50 inches.

14. The anchor of claim 4 wherein one or more portions of back side of the base lie in a wall mount plane for abutting a wall surface when the anchor is installed, and wherein a perpendicular distance between the wall mount plane and a distal end of the wall penetrating retainer is between 0.44 inches and 0.50 inches for assuring that when the anchor is installed on a wallboard that is ½ inch thick the wall penetrating retainer will approach but not pass through a back side of the wallboard.

15. The anchor of claim 4 wherein the wall penetrating extent includes a pointed distal end and a substantially uniform cross-section along a remainder of the wall penetrating extent, and a total retainer cross-sectional area of the wall penetrating extent is no more than 5 mm$^2$, wherein the cross-section is taken perpendicularly to a lengthwise axis of the wall penetrating extent at any location along the wall penetrating extent.

16. The anchor of claim 4 wherein the base and the wall penetrating retainer are formed as a monolithic unit of metal plate construction, the base formed by a base plate, and the wall penetrating retainer extends from one edge of the base plate, wherein the base plate and the wall penetrating retainer each have a tensile yield strength of no less than 160 KSI and a minimum elongation of 3%.

17. The anchor of claim 16 wherein the base plate and the wall penetrating retainer each have a thickness of no more than 0.052 inches.

18. An anchor for hanging an object on a wall, comprising:
    a base having front and back sides, at least one wall penetrating retainer extending from the base, the wall penetrating retainer including a wall penetrating extent that protrudes rearwardly of the base and has a substantially arcuate configuration, a distal side of the base defines a pivot axis about which the base can pivot when the distal side is positioned against a wall, and a center point of a radius of curvature of the wall penetrating extent is located substantially proximate the pivot axis so as to facilitate rotational insertion of the wall penetrating retainer into the wall;
    wherein the wall penetrating retainer departs from a side portion of the base and one of the base or the retainer has a bend with an initial forward progression so that the wall penetrating retainer has an initial forward progression and then turns back to define a rearward and curved progression.

19. The anchor of claim 18 wherein the side portion is a top side and the wall penetrating retainer departs from the top side of the base.

20. The anchor of claim 18 wherein the base and the wall penetrating retainer are formed as a monolithic unit of metal plate construction, the base formed by a base plate, and the side portion is formed by one edge of the base plate.

21. The anchor of claim 20 wherein the base and the wall penetrating retainer have a common plate thickness, and an initial portion of the wall penetrating retainer that is forward of the back side of the base curves forward and then curves rearward, and a radius of curvature at every point along the initial portion is no less than 100% of the plate thickness.

22. The anchor of claim 21 wherein the radius of curvature at every point along the initial portion is no less than 125% of the plate thickness.

23. An anchor for hanging an object on a wall, comprising:
    a base having front and back sides, at least one wall penetrating retainer extending from the base, the wall penetrating retainer including a wall penetrating extent that protrudes rearwardly of the base and has a substantially arcuate configuration, a distal side of the base defines a pivot axis about which the base can pivot when the distal side is positioned against a wall, and a center point of a radius of curvature of the wall penetrating extent is located substantially proximate the pivot axis so as to facilitate rotational insertion of the wall penetrating retainer into the wall;
    wherein the wall penetrating extent includes a convex curved surface separated from a concave curved surface, and lateral first and second side surfaces that are substantially planar and parallel to each other and that extend between the convex curved surface and the concave curved surface, wherein a distal end of the wall penetrating extent is shaped to provide a point, wherein the point is defined at least in part by a bevel extending from the concave surface toward the point and little or no bevel extending from the convex surface toward the point to thereby place the point closer to the convex surface of the wall penetrating extent.

24. The anchor of claim 23 wherein the point is further defined by a bevel extending from the first side surface toward the point and a bevel extending from the second side surface toward the point.

25. An anchor for hanging an object on a wall, comprising:
    a base having front and back sides, one or more wall penetrating retainers extending from the base, each wall penetrating retainer including a wall penetrating extent that protrudes rearwardly of the base and has a curved configuration, wherein the wall penetrating extent of each wall penetrating retainer is sized and configured such that the anchor can be manually rotated into type X gypsum wallboard by positioning one side adjacent the wallboard and rotating the anchor toward the wallboard to simultaneously move each wall penetrating extent into the wallboard with a force of no more 15 pounds per retainer normal to the base at a location of the wall penetrating retainer, wherein each wall penetrating extent includes a convex curved top surface separated from a concave curved bottom surface, and lateral first and second side surfaces that are substantially planar and parallel to each other.

26. The anchor of claim 25 wherein the base includes only first and second wall penetrating retainers, such that a total force of no more than 30 pounds normal to the base is required to install the anchor into type X gypsum wallboard.

27. The anchor of claim 25 wherein each wall penetrating extent includes a maximum average surface roughness of no more than 20 µinch.

28. The anchor of claim 27 wherein each wall penetrating extent has at least one of a polished surface finish, a plated surface finish, a painted finish, or a lubricant incorporated into its surface finish.

29. The anchor of claim 25 wherein the base includes only first and second wall penetrating retainers, a total retainer cross-sectional area of the wall penetrating extents is no more than 5 mm$^2$, wherein each cross-section is taken perpendicularly to a lengthwise axis of each wall penetrating extent at any location along the wall penetrating extent, each wall penetrating extent includes a pointed distal end and the cross-section is substantially uniform along a remainder of the wall penetrating extent.

30. The anchor of claim 29 wherein one or more portions of the back side of the base lie in a wall mount plane for abutting a wall surface when the anchor is installed, and wherein a perpendicular distance between the wall mount plane and a distal end of each wall penetrating retainer is between 0.44 inches and 0.50 inches for assuring that when anchor is installed on a wallboard that is ½ inch thick the wall penetrating retainer will approach but not pass through a back side of the wallboard.

31. An anchor for hanging an object on a wall, comprising:
a base having front and back sides, one or more wall penetrating retainers extending from the base, each wall penetrating retainer including a wall penetrating extent that protrudes rearwardly of the base and has a curved configuration, wherein each wall penetrating extent has a respective cross-sectional area in a cross-section that is taken perpendicularly to a lengthwise axis of each wall penetrating extent at any location along the wall penetrating extent, each wall penetrating extent includes a pointed distal end and the cross-section is substantially uniform along a remainder of the wall penetrating extent, and a total retainer cross-sectional area of the one or more wall penetrating extents is no more than 5 mm$^2$.

32. The anchor of claim 31 wherein one or more portions of a back side of the base lie in a wall mount plane for abutting a wall surface when the anchor is installed, and wherein a perpendicular distance between the wall mount plane and a distal end of each wall penetrating retainer is between 0.44 inches and 0.50 inches for assuring that when the anchor is installed on a wallboard that is ½ inch thick the wall penetrating retainer will approach but not pass through a back side wallboard.

33. The anchor of claim 32 wherein each wall penetrating extent includes a maximum average surface roughness of no more than 20 μinch.

34. An anchor for hanging an object on a wall, comprising:
a base having front and back sides, at least one wall penetrating retainer extending from the base, the wall penetrating retainer including a wall penetrating extent that protrudes rearwardly of the base and has a curved configuration, wherein the base and the wall penetrating retainer are formed as a monolithic unit of metal plate material construction, the base formed by a base plate, and the side portion is formed by one edge of the base plate, wherein the wall penetrating retainer departs from a side edge portion of the base via a continuous bend in the metal plate material, where the continuous bend has an initial forwardly curved progression and then curves back in a rearward direction, and the wall penetrating extent extends rearwardly from the continuous bend.

* * * * *